(12) United States Patent
Tagami

(10) Patent No.: US 12,025,423 B2
(45) Date of Patent: Jul. 2, 2024

(54) CAMERA INFORMATION CALCULATION DEVICE AND SYSTEM

(71) Applicant: SOCIONEXT INC., Kanagawa (JP)

(72) Inventor: Yuya Tagami, Yokohama (JP)

(73) Assignee: SOCIONEXT INC., Kanagawa (JP)

( * ) Notice: Subject to any disclaimer, the term of this patent is extended or adjusted under 35 U.S.C. 154(b) by 401 days.

(21) Appl. No.: 17/381,071

(22) Filed: Jul. 20, 2021

(65) Prior Publication Data

US 2021/0348915 A1 Nov. 11, 2021

Related U.S. Application Data

(63) Continuation of application No. PCT/JP2019/002137, filed on Jan. 23, 2019.

(51) Int. Cl.
*G01B 11/03* (2006.01)
*G03B 15/00* (2021.01)
(Continued)

(52) U.S. Cl.
CPC .............. *G01B 11/03* (2013.01); *G03B 15/00* (2013.01); *G06T 7/74* (2017.01); *G06T 7/80* (2017.01);
(Continued)

(58) Field of Classification Search
CPC ........ G01B 11/03; G03B 15/00; G03B 37/04; G06T 7/74; G06T 7/80;
(Continued)

(56) References Cited

U.S. PATENT DOCUMENTS

2002/0140670 A1* 10/2002 Albeck .................. G06T 7/521
345/156
2006/0071945 A1* 4/2006 Anabuki ............... G06F 3/0346
345/633
(Continued)

FOREIGN PATENT DOCUMENTS

CN 101583969 A 11/2009
EP 3425897 A1 1/2019
(Continued)

OTHER PUBLICATIONS

International Search Report and Written Opinion issued in corresponding International Patent Application No. PCT/JP2019/002137, dated Apr. 23, 2019, with partial English translation.

*Primary Examiner* — Abdelaaziz Tissire
(74) *Attorney, Agent, or Firm* — Rimon P.C.

(57) ABSTRACT

A camera information calculation device includes a hardware processor. The hardware processor functions as a first calculation unit and a second calculation unit. The first calculation unit calculates, based on a first image and a first video, first camera positional information indicating a position of a first camera. The first image includes a first object taken by the first camera. The first video includes the first object taken by a third camera. The second calculation unit calculates, based on a second image and a second video, second camera positional information indicating a position of a second camera disposed away from the first camera. The second image includes a second object taken by the second camera. The second video includes the second object taken by the third camera.

7 Claims, 11 Drawing Sheets

(51) Int. Cl.
*G06T 7/73* (2017.01)
*G06T 7/80* (2017.01)
*H04N 23/60* (2023.01)

(52) U.S. Cl.
CPC ... *H04N 23/60* (2023.01); *G06T 2207/30208* (2013.01); *H04N 2201/3205* (2013.01); *H04N 2201/3253* (2013.01)

(58) Field of Classification Search
CPC .......... G06T 2207/30208; H04N 23/60; H04N 2201/3205; H04N 2201/3253; H04N 23/661; H04N 23/90; H04N 25/61
See application file for complete search history.

(56) References Cited

U.S. PATENT DOCUMENTS

| | | |
|---|---|---|
| 2008/0240612 A1 | 10/2008 | Liang et al. |
| 2008/0267531 A1* | 10/2008 | Satoh ................... G06V 10/147 |
| | | 382/289 |
| 2010/0097483 A1 | 4/2010 | Icho et al. |
| 2013/0148851 A1 | 6/2013 | Leung et al. |
| 2015/0243016 A1* | 8/2015 | Moteki ..................... G06T 7/70 |
| | | 382/103 |
| 2020/0175716 A1* | 6/2020 | Miyamoto ................ G06T 7/73 |
| 2021/0183101 A1* | 6/2021 | Oryoji ....................... G06T 7/70 |
| 2021/0306540 A1* | 9/2021 | Murakami ........... H05B 47/105 |
| 2022/0058826 A1* | 2/2022 | Hasegawa .............. G01B 11/00 |

FOREIGN PATENT DOCUMENTS

| | | |
|---|---|---|
| JP | 2004-279049 A | 10/2004 |
| JP | 2005-241323 A | 9/2005 |
| JP | 2013-127783 A | 6/2013 |
| JP | 2015-204512 A | 11/2015 |
| WO | 2008/087974 A1 | 7/2008 |
| WO | 2017/149869 A1 | 9/2017 |

\* cited by examiner

CAMERA INFORMATION CALCULATION DEVICE AND SYSTEM

CROSS-REFERENCE TO RELATED APPLICATIONS

This application is a continuation of International Application No. PCT/JP20191002137, filed on Jan. 23, 2019, the entire contents of which are incorporated herein by reference.

FIELD

The present disclosure relates to a camera information calculation device and a system.

BACKGROUND

Conventionally, for video analysis using a camera, devices have been known to calculate, using a marker, camera information specifying the position of the camera (for example, Japanese Patent Application Laid-open No. 2004-279049 and Japanese Patent Application Laid-open No. 2013-127783).

In the conventional arts, however, when a plurality of cameras are installed, a camera marker needs to be included in images token by the cameras in order to determine the positional relation thereof. Thus, for example, in a case that the distance between the cameras is large, imaging ranges of the cameras do not overlap, and thus a common marker cannot be captured in images taken by the cameras, it is difficult to determine the positional relation of the cameras.

Therefore, there is a need for determining the positional relation between cameras disposed away from each other.

SUMMARY

A camera information calculation device according to one aspect of the present disclosure includes a hardware processor functioning as a first calculation unit and a second calculation unit. The first calculation unit calculates, based on a first image and a first video, first camera positional information indicating a position of a first camera. The first image includes a first object taken by the first camera. The first video includes the first object taken by a third camera. The second calculation unit calculates, based on a second image and a second video, second camera positional information indicating a position of a second camera disposed away from the first camera. The second image including a second object taken by the second camera. The second video including the second object taken by the third camera.

DETAILED DESCRIPTION

Referring to the accompanying drawings, embodiments of a camera information calculation device and a system disclosed in the present application are described in detail below.

Figure 1:
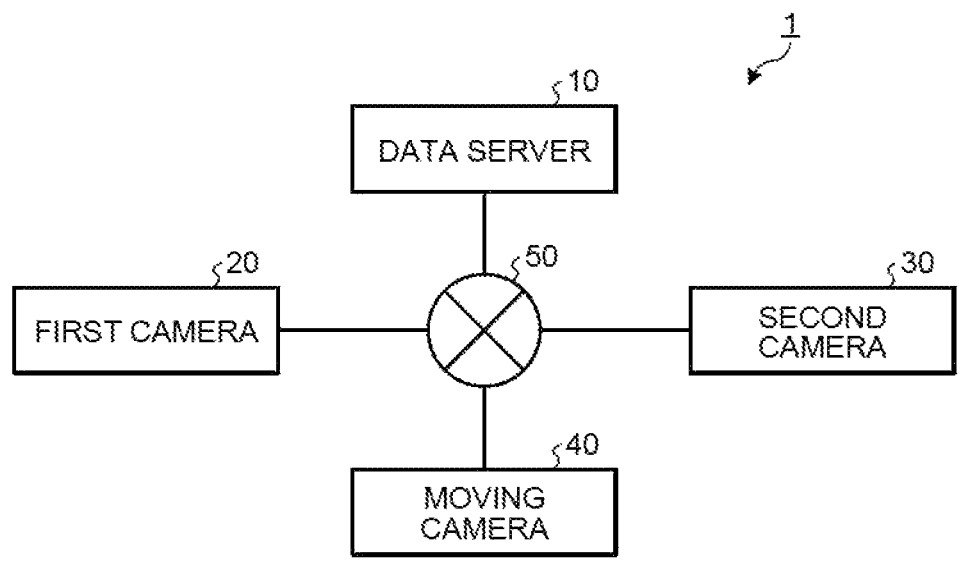
FIG. 1 is a diagram illustrating an example of a configuration of a system according to an embodiment.

FIG. 1 is a diagram illustrating an example of a configuration of a system 1 according to the present embodiment. As illustrated in FIG. 1, the system 1 according to the present embodiment includes a data server 10, a first camera 20, a second camera 30, and a moving camera 40. The first camera 20 and the second camera 30 are cameras that can be installed with selected positions and directions. The data server 10 is communicably connected to the first camera 20, the second camera 30, and the moving camera 40 over a network 50 such as the Internet.

Figure 2:
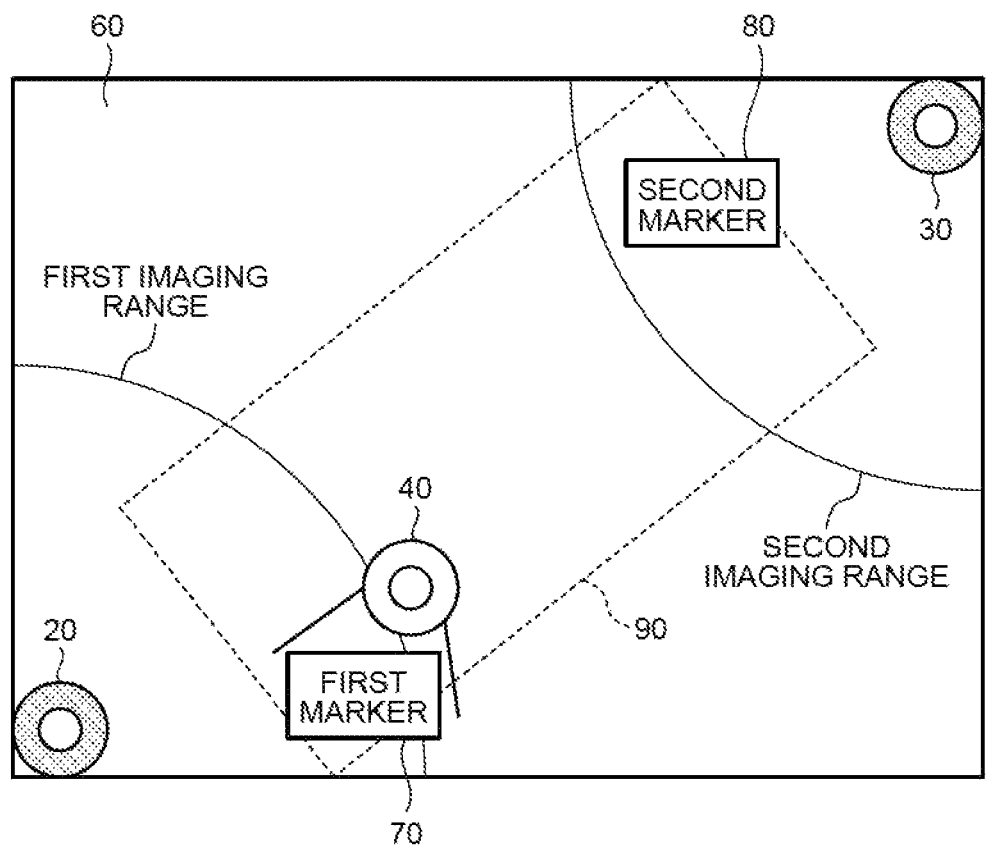
FIG. 2 is a plan view of a store to which the system according to the embodiment is applied.

FIG. 2 is a plan view of a location, for example, a store where the system 1 according to the present embodiment is applied. In the example of FIG. 2, a first marker 70 and a second marker 80 having different patterns are installed on a floor 60 of the store. In the present example, the first marker 70 and the second marker 80 are flat plate-shaped members having a rectangular matrix pattern of 8×8. In the following description, the first marker 70 and the second marker 80 are sometimes simply referred to as "markers" unless otherwise distinguished.

The first marker 70 is an example of a "first object" included in an image taken by the first camera 20, and has a first pattern corresponding to first identification information. For example, the first identification information may be an ID indicating "1", and the first pattern may be a pattern indicating the ID "1".

The first marker 70 is provided within an imaging range (first imaging range) of the first camera 20, so that an image taken by the first camera 20 includes the first marker 70. In the following description, the image taken by the first camera 20 is sometimes referred to as "first image". The first camera 20 takes a first image including the first marker 70.

The second marker 80 is an example of a "second object" included in an image taken by the second camera 30, and has a second pattern corresponding to second identification information. For example, the second identification information may be an ID indicating "2", and the second pattern may be a pattern indicating the ID "2".

The second marker 80 is provided within an imaging range (second imaging range) of the second camera 30, so that an image taken by the second camera 30 includes the second marker 80. In the following description, the image taken by the second camera 30 is sometimes referred to as "second image". The second camera 30 takes a second image including the second marker 80.

The first camera 20 and the second camera 30 are disposed away from each other, and disposed at positions at which a common marker cannot be captured in images taken by the first/second cameras 20 and 30. In the present example, the first camera 20 and the second camera 30 are disposed with a given distance or more such that imaging ranges thereof do not overlap with each other. However, the embodiment is not limited thereto. For example, the first camera 20 and the second camera 30 may be disposed at positions at which parts of the imaging ranges thereof overlap with each other but a common marker cannot be captured in taken images thereof or but a pattern of the common marker cannot be recognized.

Figure 3:
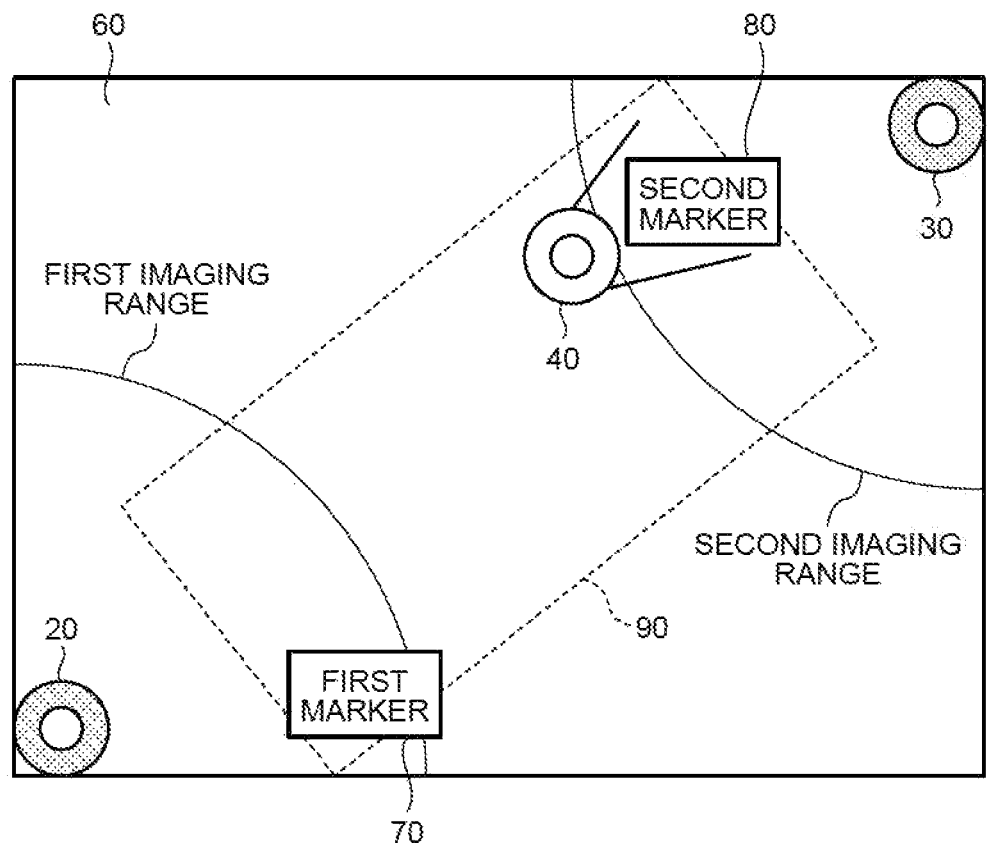
FIG. 3 is a plan view of the store to which the system according to the embodiment is applied.

In the example of FIG. 2, the moving camera 40 taking images while moving on the floor 60 is present at a position at which the moving camera 40 can image at least part of the first imaging range. To the example of FIG. 2, the moving camera 40 is present at a position at which the moving camera 40 can image the first marker 70. The moving camera 40 can take images while moving within a range 90 illustrated in FIG. 2, for example. The moving camera 40 can also move to a position at which the moving camera 40 can image at least part of the second imaging range as illustrated in FIG. 3, for example. In the example of FIG. 3, the moving camera 40 is present at a position at which the moving camera 40 can image the second marker 80. In other words, the moving camera 40 is capable of taking images while moving between a position at which the moving camera 40 can image at least part of the first imaging range and a position at which the moving camera 40 can image at least part of the second imaging range. The moving camera 40 can take images successively, or can take images a plurality of times such that a plurality of imaging ranges overlap with each other. The moving camera 40 is an example of "third camera", and takes a first video including the first marker 70 and a second video including the second marker 80. The form of "third camera" is not limited to the moving camera 40. In the present example, at least part of an imaging range of the first video and at least part of an imaging range of the second video overlap with each other, but the embodiment is not limited thereto.

The moving camera 40 may be, for example, a portable device with a camera (such as a smartphone, a tablet, and a drone). In the present embodiment, the moving camera 40 is a terminal device with a camera that is carried by a user moving on the floor 60 of the store, but the embodiment is not limited thereto.

Figure 4:
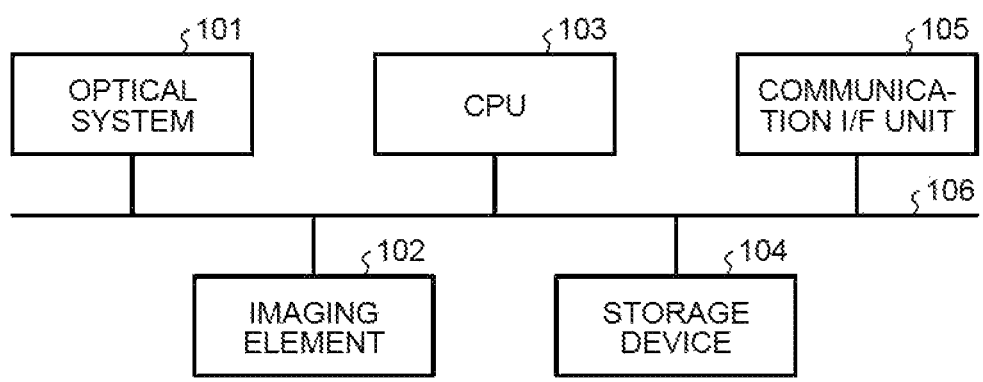
FIG. 4 is a diagram illustrating an example of a basic hardware configuration of a first camera, a second camera, and a moving camera according to the embodiment.

FIG. 4 is a diagram illustrating an example of a basic hardware configuration of the first camera 20, the second camera 30, and the moving camera 40. FIG. 4 exemplifies the minimum required hardware elements, but the embodiment is not limited thereto. The first camera 20, the second camera 30, and the moving camera 40 may include other hardware elements (such as input device and display device).

As illustrated in FIG. 4, the first camera 20, the second camera 10, and the moving camera 40 each include an optical system 101 such as a lens, an imaging element 102, a central processing unit (CPU) 103, a storage device 104, and a communication I/F unit 105. The optical system 101, the imaging element 102, the CPU 103, the storage device 104, and the communication I/F unit 105 are mutually connected over a bus 106.

The imaging element 102 is an element for converting an image to be taken that is formed by the optical system 101 such as a lens into an electric signal (element for performing imaging). The CPU 103 corresponds to an example of a hardware processor. The CPU 103 controls operations of devices (any of first camera 20, second camera 30, and moving camera 40). The CPU 103 implements various kinds of functions of the devices by executing computer programs stored in the storage device 104. Various functions of the first camera 20, the second camera 30, and the moving camera 40 are described later.

Various kinds of data such as computer programs are stored in the storage device 104. For example, the storage device 104 includes a read only memory (ROM) as a non-volatile memory for storing computer programs therein and a random access memory (RAM) as a volatile memory having a work area of the CPU 103. The communication I/F unit 105 is an interface for connection to the network 50.

Figure 5:
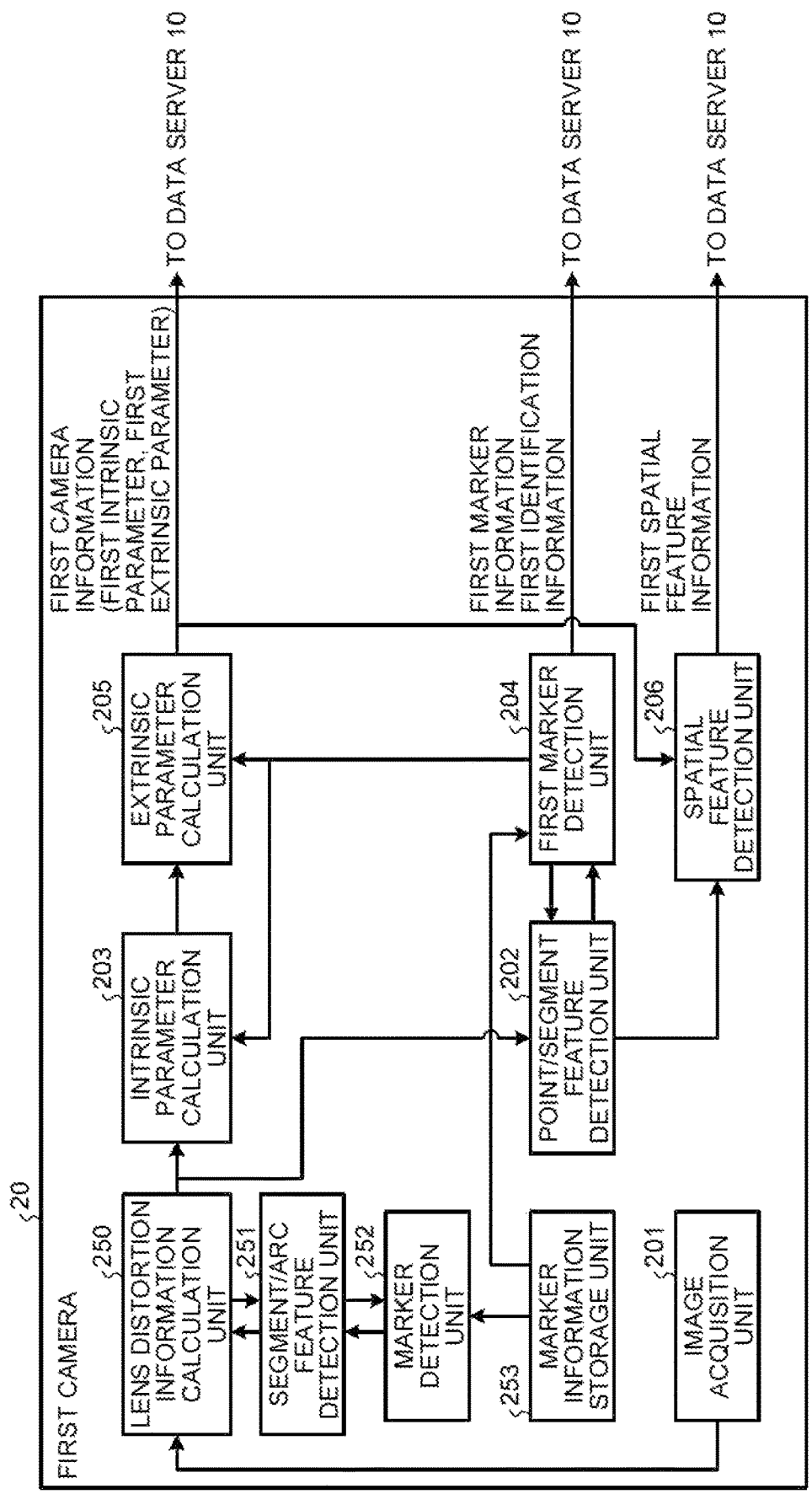
FIG. 5 is a diagram illustrating an example of functions of the first camera according to the embodiment.

FIG. 5 is a diagram illustrating an example of functions of the first camera 20. Note that, FIG. 5 mainly exemplifies functions related to the present embodiment, and the functions of the first camera 20 are not limited thereto. As illustrated in FIG. 5, the first camera 20 includes an image acquisition unit 201, a point/segment feature detection unit 202, an intrinsic parameter calculation unit 203, a first marker detection unit 204, an extrinsic parameter calculation unit 205, a spatial feature detection unit 206, a lens distortion information calculation unit 250, a segment/arc feature detection unit 251, a marker detection unit 252, and a marker information storage unit 253.

The image acquisition unit 201 acquires a first image taken by the first camera 20. Specifically, the image acquisition unit 201 acquires a first image taken by the element 102.

The lens distortion information calculation unit 250 analyzes the first image acquired by the image acquisition unit 201. Segment data (a straight line or an arc) is detected by the segment/arc feature detection unit 251. The lens distortion information calculation unit 250 calculates lens distortion information on the first camera 20 based on the segment data detected by the segment/arc feature detection unit 251. Note that the marker detection unit 252 may detect a marker based on segment data, and the lens distortion information calculation unit 250 may use shape and size information on the marker detected by the marker detection unit 252 to calculate lens distortion information. A model formula of lens distortion is expressed by a high order equation using a distortion coefficient in a radial direction of the lens and a distortion coefficient in a circumferential direction of the lens, and the lens distortion information is expressed by these coefficients. The lens distortion information calculation unit 250 gives the calculated lens distortion information to the intrinsic parameter calculation unit 203. The lens distortion information calculation unit 250 gives the lens distortion information and an image obtained by removing distortion in the first image to the pond/segment feature detection unit 202. Alternatively, when, the lens distortion information calculation unit 250 does not generate an image obtained by removing distortion, the lens distortion information calculation unit 250 gives the leas distortion information and the first image to the point/segment feature detection unit 202. In the present example, the lens distortion information is calculated by using the first image taken by the first camera 20, but the embodiment is not limited thereto. Known lens distortion information may be given in advance.

The point/segment feature detection unit 202 analyzes the lens distortion information, calculated by the lens distortion information calculation unit 250 and the first image or an image obtained by removing the distortion of the first image. More specifically, the point/segment feature detection unit 202 extracts feature data such as features of the first marker 70 peripheral information on the first marker 70, and spatial features (features of straight line or plane corresponding to ground or wall in the entire image. Note that the point/segment feature detection unit 202 is not necessarily required to analyze an image obtained by removing lens distortion, and may extract a result of correcting the segment data detected by the segment/are feature detection unit 251 by using lens distortion information as feature data.

The first marker detection unit 204 detects the first marker 70 in the first image based on the feature data detected by the point/segment feature detection unit 202 and marker identification information stored in the marker information storage unit 253. After that, the first marker detection unit 204 gives first marker information indicating the position and shape of the detected first marker 70 to the intrinsic parameter calculation unit 203, the extrinsic parameter calculation unit 205, and the data server 10. In the present example, the first marker detection unit 204 recognizes first identification information corresponding to a first pattern in the detected first marker 70, and gives the recognized first identification information to the data server 10 together with the first marker information. Examples of the first marker information include information indicating the size of one side of the first marker 70, the size of one side of a rectangle forming the first pattern, and the position of the first marker 70 in the first image.

The intrinsic parameter calculation unit 203 calculates a first intrinsic parameter indicating an intrinsic parameter in the first camera 20 based on: the lens distortion information received from the lens distortion information calculation unit 250; a known lens focal length of the first camera 20; and the first marker information received from the first marker detection unit 204. The first intrinsic parameter is expressed by a matrix that defines a correspondence between coordinate points in a camera three-dimensional coordinate system of the first camera 20 (for example, a three-dimensional coordinate system whose origin is located in a lens center of a camera) and coordinate points in a coordinate system of the first image taken by the first camera 20 (two-dimensional coordinate system). The intrinsic parameter calculation unit 203 gives the calculated first intrinsic parameter and the lens distortion information received from the lens distortion information calculation unit 250 to the extrinsic parameter calculation unit 205. The lens distortion information may be a single piece of information on the intrinsic parameter. Hereinafter, when the lens distortion information is referred to as "first intrinsic parameter", the intrinsic parameter includes the lens distortion information. Note that various publicly known technologies can be used as a method for calculating the first intrinsic parameter. In the present example, the first intrinsic parameter is calculated by using the first image taken by the first camera 20, but the embodiment, is not limited thereto. A known first intrinsic parameter may be given in advance.

The extrinsic parameter calculation unit 205 calculates a first extrinsic parameter indicating an extrinsic parameter in the first camera 20 based on the first intrinsic parameter received from the intrinsic parameter calculation unit 203 and the first marker information received from the first marker detection unit 204. In the present example, the extrinsic parameter calculation unit 205 sets a three-dimensional coordinate system for the first camera 20. The origin of this three-dimensional coordinate system is set on the first marker 70 detected by the first marker detection unit 204 (for example, the center of the first marker 70 or one of four corners of the first marker 70). The extrinsic parameter calculation unit 205 calculates, as a first extrinsic parameter, a matrix that defines a correspondence between coordinate points in the set three-dimensional coordinate system far the first camera 20 and coordinate points in the above-described camera three-dimensional coordinate system of the first camera 20. The first extrinsic parameter calculated by the extrinsic parameter calculation unit 205 is information that can specify the position and the orientation of the first camera 20 in the three-dimensional coordinate system for the first camera 20. The extrinsic parameter calculation unit 205 transmits, to the data server 10, the calculated first extrinsic parameter and the first, intrinsic parameter received from the intrinsic parameter calculation unit 203 as first camera information indicating camera information on the first camera 20.

The spatial feature detection unit 206 detects spatial features around the first marker 70 based on the first intrinsic parameter and the first extrinsic parameter received from the extrinsic parameter calculation unit 205 and the feature data received from the point segment feature detection unit 202. The spatial feature detection unit 206 transmits, to the data server 10, first spatial feature information indicating peripheral information on the first marker 70 and information on spatial features in the entire image. The information spatial features (spatial feature information) may include a pair of an identifier, such as a straight line, a plane, and a corner, and positional information. The data server 10 manages (or holds) the first camera information, the first marker information, the first spatial feature information, and the first identification information transmitted from the first camera 20 in association with one another.

The functions of the first camera 20 described above are implemented by the CPU 103 executing computer programs stored in the storage device 104. However, the embodiment is not limited thereto, and the whole or part of the above-described functions of the first camera 20 may be implemented by a dedicated hardware circuit.

Figure 6:
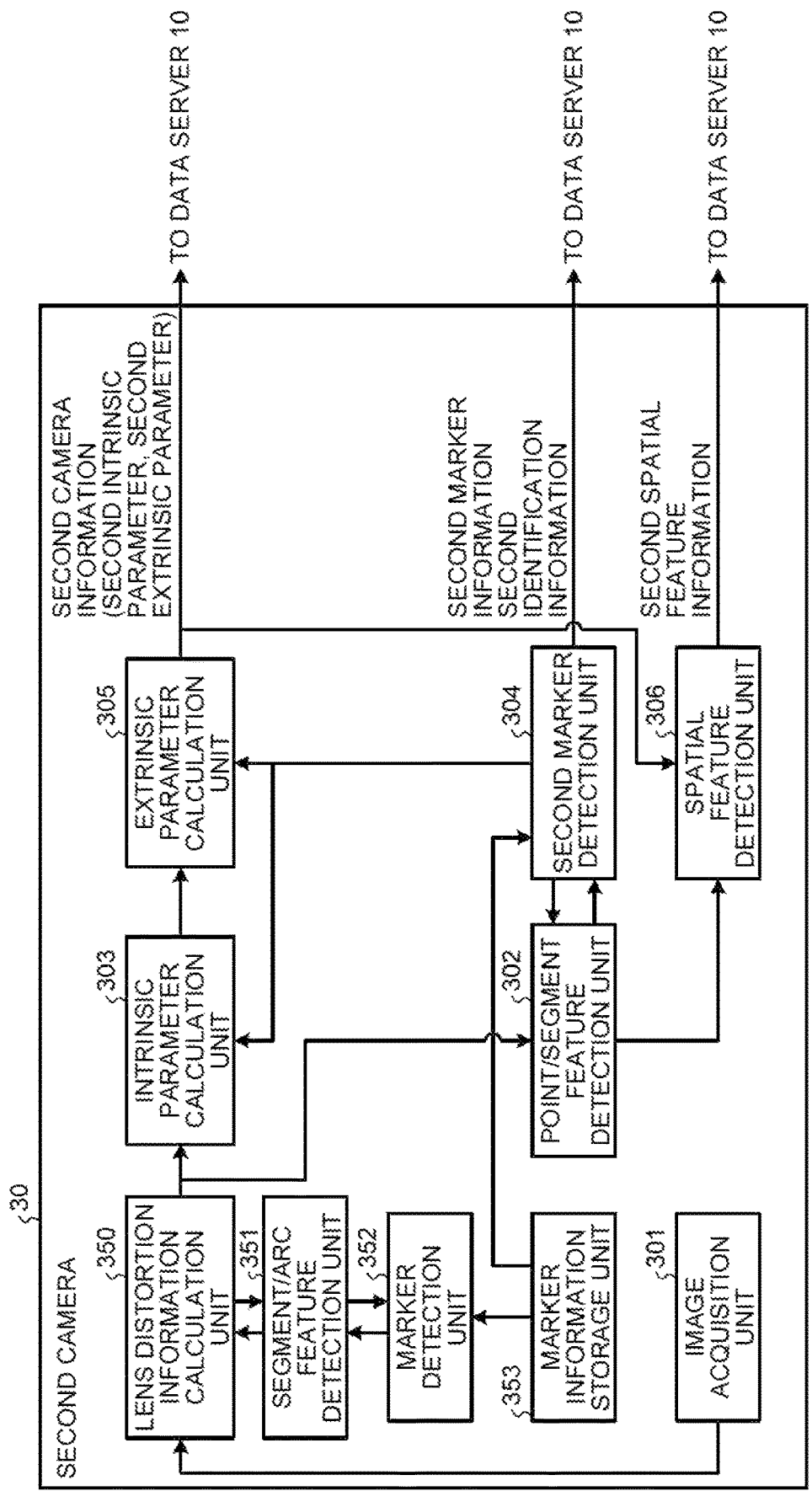
FIG. 6 is a diagram illustrating an example of functions of a second camera according to the embodiment.

FIG. 6 is a diagram illustrating an example of functions of the second camera 30. Note that FIG. 6 mainly exemplifies the functions related to the present embodiment, but the functions of the second camera 30 are not limited thereto. As illustrated in FIG. 6, the second camera 30 includes an image acquisition unit 301, a point/segment feature detection unit 302, an intrinsic parameter calculation unit 303, a second marker detection unit 304, an extrinsic parameter calculation unit 305, a spatial feature detection unit 306, a lens distortion information calculation unit 350, a segment/arc feature detection unit 351, a marker detection unit 352, and a marker information storage unit 353. The basic functions are similar to the functions on the first camera 20 side, and hence the functions of the second camera 30 are described below while the description thereof is simplified as appropriate.

The image acquisition unit 301 acquires a second image taken by the second camera 30. Specifically, the image acquisition unit 301 acquires a second image taken by the imaging element 102.

The lens distortion information calculation unit 350 analyzes the second image acquired by the image acquisition unit 301, and segment data (a straight line or an arc) is detected by the segment/arc feature detection unit 351. The lens distortion information calculation unit 350 calculates lens distortion information on the second camera 30 based on segment data detected by the segment/arc feature detection unit 351. Note that the marker detection unit 352 may detect a marker based on segment data, and the lens distortion information calculation unit 350 may use shape and size information on the marker detected by the marker detection unit 352 to calculate lens distortion information. A model formula of lens distortion is expressed by a high order equation using a distortion coefficient in a radial direction of the lens and a distortion coefficient in a circumferential direction of the lens, and the lens distortion information is expressed by these coefficients. The lens distortion information calculation unit 350 gives the calculated lens distortion information to the intrinsic parameter calculation unit 303. The lens distortion information calculation unit 350 gives the lens distortion information and an image obtained by removing distortion in the second image to the point/segment feature detection unit 302. Alternatively, when the lens distortion information calculation unit 350 does not generate all image obtained by removing distortion, the lens distortion information calculation unit 350 gives the lens distortion information and the second image to the point/segment feature detection unit 302. In the present example, lens distortion information is calculated by using the second image taken by the second camera 30, but the embodiment is not limited thereto. Known lens distortion information may be given in advance.

The point/segment feature detection unit 302 analyzes the lens distortion information calculated by the lens distortion info/matron calculation unit 350 and the second image or an image obtained by removing distortion in the second images. More specifically, the point/segment feature detection unit 302 extracts feature data such as features of the second marker 80, peripheral information on the second marker 80, and spatial features in the entire image. Note that the point/segment feature detection unit 302 is not necessarily required to analyze an image obtained by removing lens distortion, and may extract a result of correcting the segment data detected by the segment/arc feature detection unit 351 by using lens distortion information as feature data.

The second marker detection unit 304 detects the second marker 80 in the second image based on the feature data detected by the point/segment feature detection unit 302 and marker identification information stored in the marker in storage unit 353, and gives second marker information indicating the position and shape of the detected second marker 80 to the intrinsic parameter calculation unit 303, the extrinsic parameter calculation unit 305, and the data server 10. The second marker detection unit 304 recognizes second identification information corresponding to a second pattern in the detected second marker 80, and transmits the recognized second identification information to the data server 10 together with the second marker information. Examples of the second marker information include information indicating the size of one side of the second marker 80, the size of a size of a rectangle forming the second pattern, and the position of the second marker 80 in the second image.

The intrinsic parameter calculation unit 303 calculates a second intrinsic parameter indicating an intrinsic parameter in the second camera 30 based on lens distortion information received from the lens distortion information calculation unit 350, a known lens focal length of the second camera 30, and the second marker information received from the second marker detection unit 304. The second intrinsic parameter is expressed by a matrix that defines a correspondence between coordinate points in a camera three-dimensional coordinate system of the second camera 30 (for example, three-dimensional coordinate system whose origin is located in a lens center of a camera) and coordinate points in a coordinate system of the second image taken by the second camera 30 (two-dimensional coordinate system). The intrinsic parameter calculation unit 303 gives, to the extrinsic parameter calculation unit 305, the calculated second intrinsic parameter and the lens distortion information received from the lens distortion information calculation unit 350. The lens distortion information nay be a single piece of information on the intrinsic parameter. Hereinafter, when the lens distortion information is referred to as "second intrinsic parameter", the intrinsic parameter includes the lens distortion information. Note that various publicly known technologies can be used as a method for calculating the second intrinsic parameter. In the present example, the second intrinsic parameter is calculated by using the second image taken by the second camera 30, but the embodiment is not limited thereto. A blown intrinsic parameter may be given in advance.

The extrinsic parameter calculation unit 305 calculates a second extrinsic parameter indicating an extrinsic parameter in the second camera 30 based on the second intrinsic parameter received from the intrinsic parameter calculation unit 303 and the second marker information received from the second marker detection unit 304. The extrinsic parameter calculation unit 305 sets a three-dimensional coordinate system for the second camera 30. The origin of this three-dimensional coordinate system is set on the second marker 80 detected by the second marker detection unit 304 (for example, the center of the second marker 80 or one of four corners of the second marker 80). The extrinsic parameter calculation unit 305 calculates, as a second extrinsic parameter, a matrix that defines a correspondence between coordinate points in the set three-dimensional coordinate system for the second camera 30 and coordinate points in the camera three-dimensional coordinate system of the second camera 30. The second extrinsic parameter calculated by the extrinsic parameter calculation unit 305 is information that can specify the position and the orientation of the second camera 30 in the three-dimensional coordinate system for the second camera 30. The extrinsic parameter calculation unit 305 transmits, to the data server 10, the calculated second extrinsic parameter and the second intrinsic parameter received from the intrinsic parameter calculation unit 303 as second camera information indicating camera information on the second camera 30.

The spatial feature detection unit 306 detects spatial features around the second marker 80 based on the second intrinsic parameter and the second extrinsic parameter received from the extrinsic parameter calculation unit 305 and the feature data received from the point/segment feature detection unit 302. The spatial feature detection unit 306 transmits, to the data server 10, second spatial feature information indicating peripheral information on the second marker 80 and information on spatial features in the entire image. The data server 10 manages (or holds) the second camera information, the second marker information, the second spatial feature information, and the second identification information transmitted from the second camera 30 in accordance with one another. In the following description, the first marker information and the second marker information managed by the data server 10 are sometimes simply referred to as "marker information" unless otherwise distinguished. Similarly, the first identification information and the second identification information managed by the data server 10 are sometimes simply referred to as "identification information" unless otherwise distinguished, and the first spatial feature information and the second spatial feature information are sometimes simply referred to as "spatial feature information" unless otherwise distinguished.

The functions of the second camera 30 described above are implemented by the CPU 103 executing computer programs stored in the storage device 104. However, the embodiment is not limited thereto, and, for example, the whole or part of the above-described functions of the second camera 30 may be implemented by a dedicated hardware circuit.

Figure 7:
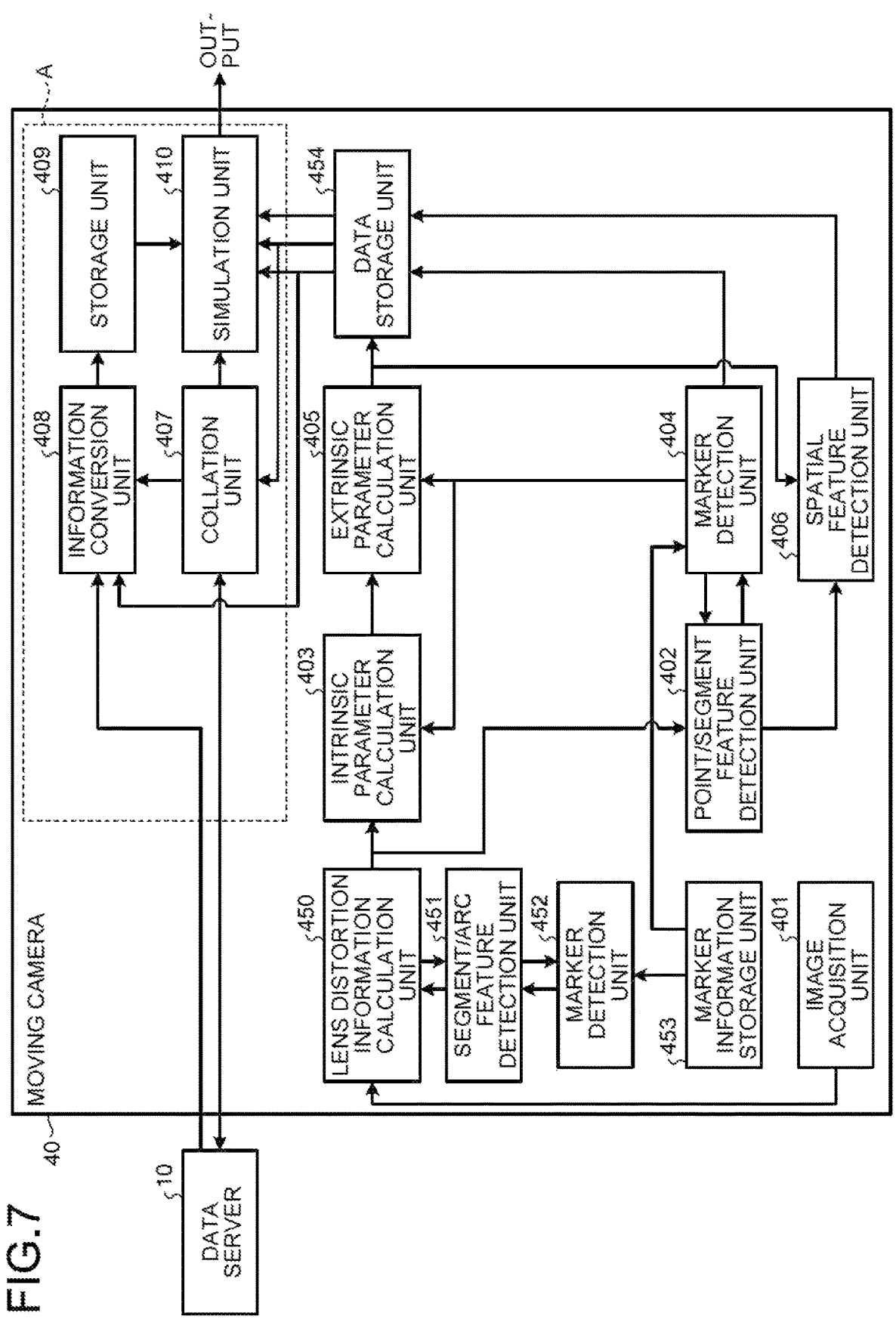
FIG. 7 is a diagram illustrating an example of functions of a moving camera according to the embodiment.

FIG. 7 is a diagram illustrating an example of functions of the moving camera 40. Note that FIG. 7 mainly exemplifies the functions related to the present embodiment, but the functions of the moving camera 40 are not limited thereto. As illustrated in FIG. 7, the moving camera 40 includes an image acquisition unit 401, a point/segment feature detection unit 402, an intrinsic parameter calculation unit 403, a marker detection unit 404, an extrinsic parameter calculation unit 405, a spatial feature detection unit 406, a lens distortion information calculation unit 450, a segment/arc feature detection unit 451, a marker detection unit 452, and a marker information storage unit 453. The moving camera 40 further includes a collation unit 407, an information conversion unit 408, a storage unit 409, a simulation unit 410, and a data storage unit 454.

The functions of the moving camera 40 are described below. The image acquisition unit 401 acquires a video taken by the moving camera 40. More specifically, the image acquisition unit 401 sequentially acquires third images (acquires video) taken by the imaging element 102 in a time series manner.

The lens distortion information calculation unit 450 analyzes the third in acquired by the image acquisition unit 401, and segment data (a straight line or an arc) is detected by the segment/arc feature detection unit 451. The lens distortion information calculation unit 450 calculates lens distortion information in the moving camera 40 based on the segment data detected by the segment/arc feature detection unit 451. Note that the marker detection unit 452 may detect a marker based on segment data, and the lens distortion information calculation unit 450 may use shape and size information on the marker detected by the marker detection unit 452 to calculate lens distortion information. A model formula of lens distortion is expressed by a high order equation using a distortion coefficient in a radial direction of the lens and a distortion coefficient in a circumferential direction of the lens, and the lens distortion information is expressed by these coefficients. The lens distortion information calculation unit 450 gives the calculated lens distortion information to the intrinsic parameter calculation unit 403. The lens distortion information calculation unit 450 gives the lens distortion information and an image obtained by removing distortion in the third images to the point/segment feature detection unit 402. Alternatively, when the lens distortion information calculation unit 450 does not generate an image obtained by removing distortion, the lens distortion information calculation unit 450 gives the lens distortion information and the third images to the point/segment feature detection unit 402. In the present example, lens distortion information is calculated by using a video (third images) taken by the moving camera 40, but the embodiment is not limited thereto. Known lens distortion information may be given in advance.

The point/segment feature detection unit 402 analyzes the lens distortion information calculated by the lens distortion information calculation unit 450 and the third images or an image obtained by removing distortion in the third images. More specifically, the point/segment feature detection unit 402 extracts feature data included in the video such as features of the marker, peripheral information on the marker, and spatial features (features of straight line or plane corresponding to ground or wall) in the entire image. Note that the point/segment feature detection unit 402 is not necessarily required to analyze an image obtained by removing lens distortion, and may extract a result of correcting the segment data detected by the segment/arc feature detection unit 451 by using lens distortion information as feature data.

The marker detection unit 404 detects a marker (in the present example, first marker 70 or second marker 80) in the video based on the feature data detected by the point/segment feature detection unit 402 and marker identification information stored in the marker information storage unit 453. The marker detection unit 404 gives third marker information indicating the position and shape of the detected marker to the intrinsic parameter calculation unit 403 and the extrinsic parameter calculation unit 405. Examples of the third marker information include information indicating the size of one side of the marker, the size of one side of a rectangle forming the pattern in the marker, and the position of the marker in the video. The marker detection unit 404 recognizes identification information corresponding to a pattern in the detected marker, and gives the recognized third identification information to the extrinsic parameter calculation unit 405 and the data storage unit 454 together with the third marker information. For example, the marker detection unit 404 may also use images of a plurality of frames to detect a marker and recognize third identification information.

The intrinsic parameter calculation unit 403 calculates a third intrinsic parameter indicating an intrinsic parameter in the moving camera 40 based on: the lens distortion information received from the lens distortion information calculation unit 450; a known lens focal length of the moving camera 40; a lens distortion coefficient; and the third marker information received from the marker detection unit 404. The third intrinsic parameter is expressed by a matrix that defines a correspondence between coordinate points in a camera three-dimensional coordinate system of the moving camera 40 (for example, a three-dimensional coordinate system whose origin is located in a lens center of a camera) and coordinate points in a coordinate system of the video (third images) taken by the moving camera 40 (a two-dimensional coordinate system). The intrinsic parameter calculation unit 403 gives, to the extrinsic parameter calculation unit 405, the calculated third intrinsic parameter and the lens distortion information received from the lens distortion information calculation unit 450. The lens distortion information may be a single piece of information on the intrinsic parameter. Hereinafter, when the lens distortion information is referred to as "third intrinsic parameter", the intrinsic parameter includes the lens distortion information. Note that various publicly known technologies can be used as a method for calculating the intrinsic parameter. In the present example, the intrinsic parameter is calculated by using the video (third images) taken by the moving camera 40, but the embodiment is not limited thereto. A known intrinsic parameter may be given in advance.

The extrinsic parameter calculation unit 405 calculates a third extrinsic parameter indicating an extrinsic parameter in the moving camera 40 based on the third intrinsic parameter received from the intrinsic parameter calculation unit 403 and the third marker information received from the marker detection unit 404. In the present example, the extrinsic parameter calculation unit 405 sets a three-dimensional coordinate system for the moving camera 40. The origin of this three-dimensional coordinate system is set on a marker (in the present example, the first marker 70) initially detected by the marker detection unit 404 (for example, the center of the first marker 70 or one of four corners of first marker 70). The extrinsic parameter calculation unit 405 calculates, as a third extrinsic parameter, a matrix that defines a correspondence between coordinate points in the set three-dimensional coordinate system for the moving camera 40 and coordinate points in the above-described camera three-dimensional coordinate system of the moving camera 40. The third extrinsic parameter calculated by the extrinsic parameter calculation unit 405 is information that can specify the position and the orientation of the moving camera 40 in the three-dimensional coordinate system for the moving camera 40. In the present example, even when the second and subsequent markers (in the present example, the second marker 80) are detected, the extrinsic parameter calculation unit 405 does, not change the origin, and calculates a third extrinsic parameter based on video successively taken by the moving camera 40 (and based on a movement amount and acceleration of an object determined from the video).

The extrinsic parameter calculation unit 405 calculates a third extrinsic parameter in the moving camera 40 each time the extrinsic parameter calculation unit 405 receives third marker information from the marker detection unit 404 (that is, each time new marker is detected). The extrinsic parameter calculation unit 405 gives, to the data storage unit 454, the calculated third extrinsic parameter and the third intrinsic parameter received from the intrinsic parameter calculation unit 403 as third camera information indicating camera information on the moving camera 40. The extrinsic parameter calculation unit 405 gives the third marker information received from the marker detection unit 404 to the data storage unit 454. In other words, in the present example, each time a marker is detected by the marker detection unit 404, third camera information and third marker information corresponding to the marker are stored in the data storage unit 454.

The spatial feature detection unit 406 detects spatial features around the marker based on the third intrinsic parameter and the third extrinsic parameter received from the extrinsic parameter calculation unit 405 and the feature data received from the point/segment feature detection unit 402. The spatial feature detection unit 406 gives, to the data storage unit 454, third spatial feature information indicating peripheral information on the marker and information on spatial features in the entire in age. In the present example, the third spatial feature information may include a pair of an identifier, such as a straight line, a plane, and a corner, and positional information. The third camera information on the moving camera 40, the third marker information, the third spatial feature information, and the third identification information are stored in the data storage unit 454.

The collation unit 407 reads out a pair of third marker information and third identification information from the data storage unit 454, and checks whether identification information, which matches the third identification information included in the pair, is present in the data server 10. When the checked identification information is present in the data server 10, the collation unit 407 sets a reference coordinate system. Specifically, the collation unit 407 determines that the first marker 70 detected from the first image taken by the first camera 20 or the second marker 80 detected from the second image taken by the second camera 30 is the same as a marker detected from a video taken by the moving camera 40 and associates the markers with each other, sets reference coordinates, and transmits the fact that the identification information is identification information on the marker set to the reference coordinate system to the data server 10. In the present example, the reference coordinate system uses the first marker 70 as a reference. Third identification information that is set as reference coordinates among a plurality of pieces of third identification information includes identification information that is set to the reference coordinate system, and the collation unit 407 transmits the third identification information to the information conversion unit 408 and the simulation unit 410. When the checked identification information is present in the data server 10, the collation unit 407 instructs the data server 10 to transmit first or second camera information, first or second marker information, and first or second spatial feature information associated with the identification information to the information conversion unit 408. The instructed data server 10 transmits the first or second camera information, the first or second marker information, and the first or second spatial feature information to the information conversion unit 408.

When the information conversion unit 408 receives the first or second camera information, the first or second marker information, and the first or second spatial feature information from the data server 10, the information conversion unit 408 converts the first or second camera information, the first or second marker information, and the first or second spatial feature information in accordance with the above-described reference coordinate system. In other words, when the first marker 70 included in the first image taken by the first camera 20 or the second marker 80 included in the second image taken by the second camera 30 is detected from a video taken by the moving camera 40, the information conversion unit 408 converts the first camera information on the first camera 20 or the second camera information on the second camera 10 in accordance with the reference coordinate system. Specific contents of the information conversion unit 408 are described later. The information converted by the information conversion unit 408 (convened information) is stored in the storage unit 409.

The simulation unit 410 reads converted information on the first camera 20 and the second camera 30 stored in the storage unit 409, reads and converts information from the data storage unit 454 on the moving camera 40 side, and compares the pieces of information to detect a difference. More specific functions of the simulation unit 410 are described later.

Figure 8:
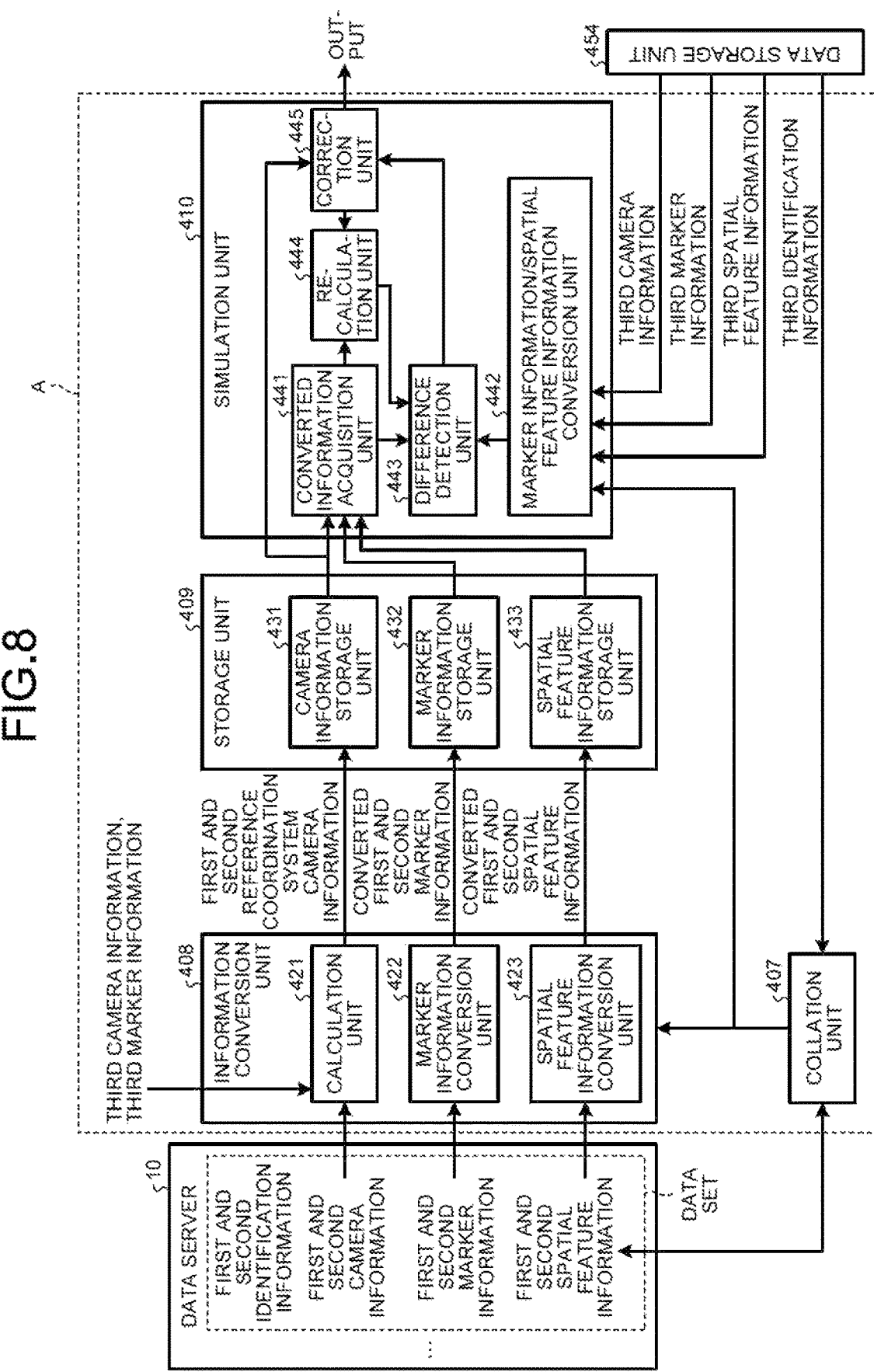
FIG. 8 is a diagram illustrating a detailed example of the functions of the moving camera according to the embodiment.

FIG. 8 is a functional block diagram for describing more specific contents of the information conversion unit 408, the storage unit 409, and the simulation unit 410. The part "A" illustrated in FIG. 8 corresponds to the part "A" illustrated in FIG. 7. As described above, when identification information, which matches the third identification information included in the pair read out from the data storage unit 454, is present in the data server 10, the collation unit 407 instructs the data server 10 to transmit information on the first camera 20 or the second camera 30 associated with the identification information (first or second camera information, first or second marker information, and first or second spatial feature information) to the information conversion unit 408. The instructed data server 10 transmits the information on the first camera 20 or the second camera 30 to the information conversion unit 408. The information conversion unit 408 receives the third identification information including identification information set to the reference coordinate system from the collation unit 407.

In other words, each time the first marker 70 included in the first image taken by the first camera 20 or the second marker 80 included in the second image taken by the second camera 30 is detected from a video taken by the moving camera 40. Information on the first camera 20 or the second camera 30 is input to the information conversion unit 408 and is converted by the information conversion unit 408. In the present example, when the first marker 70 is detected from a video from the moving camera 40, the first camera information on the first camera 20, the first marker information, and the first spatial feature information are input to the information conversion unit 408. After that, when the second marker 80 is detected from a video from the moving camera 40 that has moved to a position at which the moving camera 40 can image the second imaging range, the second camera information on the second camera 30, the second marker information, and the second spatial feature information are input to the information conversion unit 408.

As illustrated in FIG. 8, the information conversion unit 408 includes a calculation unit 421, a marker information conversion unit 422, and a spatial feature information conversion unit 423.

Figure 9:
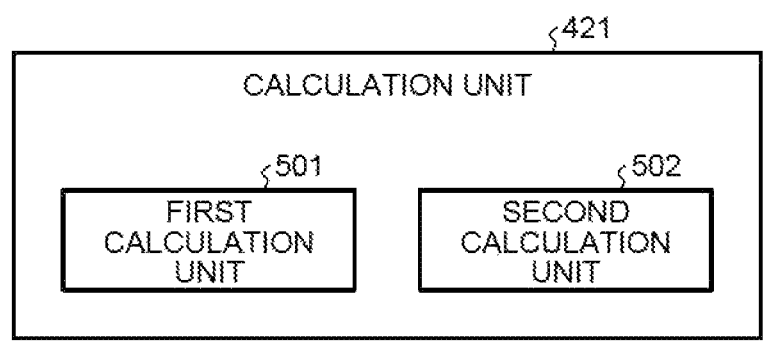
FIG. 9 is a diagram illustrating an example of functions of a calculation unit according to the embodiment.

The calculation unit 421 converts the first camera information on the first camera 20 or the second camera information on the second camera 30 in accordance with the above-described reference coordinate system, and outputs first or second reference coordinate system camera information. FIG. 9 is a diagram illustrating an example of functions of the calculation unit 421. As illustrated in FIG. 9, for example, the calculation unit 421 includes a first calculation unit 501 and a second calculation unit 502. Note that FIG. 9 mainly exemplifies the functions related to the present embodiment, but the functions of the calculation unit 421 are not limited thereto.

The first calculation unit 501 calculates first reference coordinate system camera information indicating the position of the first camera 20 based on the first image including the first marker 70 that is taken by the first camera 20 and the first video including the first marker 70 that is taken by the moving camera 40. More specifically, when the first marker 70 is detected from a video taken by the moving camera 40, the first calculation unit 501 converts the first camera information into first reference coordinate system camera information indicating the position of the first camera 20 in the reference coordinate system based on the first image. In the present example, the video including the first marker 70 that is taken by the moving camera 40 corresponds to "first video", but the embodiment is not limited thereto. In the present example, the first reference coordinate system camera information is a first extrinsic parameter in the first camera 20 that defines a correspondence between coordinate points in the reference coordinate system and coordinate points in the camera three-dimensional coordinate system of the first camera 20 (first extrinsic parameter adjusted to reference coordinate system; hereinafter sometimes referred to as "converted first extrinsic parameter"), but the embodiment is not limited thereto. The first reference coordinate system camera information only needs to be information indicating a correspondence between the reference coordinate system being in common among the first camera 20, the second camera 30, and the moving camera 40, and the coordinate system of the first camera 20. A specific method for calculating the first reference coordinate system camera information is described below.

When the first calculation unit 501 according to the present embodiment receives information on the first camera 20 from the data server 10, that is, when the first marker 70 is detected from a video taken by the moving camera 40, the first calculation unit 501 converts a first extrinsic parameter into first reference coordinate system camera information. The first calculation unit 501 calculates, as first reference coordinate system camera information, a first extrinsic parameter adjusted to the reference coordinate system based on: the three-dimensional position (x, y, z) and orientation (rotation) of the first marker 70 in the reference coordinate system; the first intrinsic parameter in the first camera 20; and the position and orientation of the first marker 70 in the first image.

In the present example, the first intrinsic parameter in the first camera 20 is included in the first camera information on the first camera 20 that is received from the data server 10. Information indicating the position of the first marker 70 in the first image is included in the first marker information received from the data server 10. As described above, the first camera information on the first camera 20 and the first marker information received from the data server 10 are determined based on the first image. In the present example, the position of the first marker 70 in the reference coordinate system is set on the origin of the reference coordinate system, so that the position of the first marker 70 can be specified without using a video from the moving camera 40. Thus, it can be considered that the first calculation unit 501 calculates first reference coordinate system camera information indicating the position of the first camera 20 in the reference coordinate system based on the first image. The first reference coordinate system camera information is an example of "first camera positional information", but the embodiment is not limited thereto. As described above, in the present example, the first reference coordinate system camera information is a converted first extrinsic parameter in the first camera 20, but the embodiment is not limited thereto.

The second calculation unit 502 calculates second reference coordinate system camera information indicating the position of the second camera 30 based on a second image including the second marker 80 that is taken by the second camera 30 disposed separately from the first camera 20 and a second video including the second marker 80 that is taken by the moving camera 40. More specifically, when the second marker 80 is detected from a video taken by the moving camera 40, the second calculation unit 502 converts the second camera information into second reference coordinate system camera information indicating the position of the second camera 30 in the reference coordinate system based on the second image and the video taken by the moving camera 40. In the present example, the video including the second marker 80 that is taken by the moving camera 40 corresponds to "second video", but the embodiment is not limited thereto. In the present example, the second reference coordinate system camera information is a second extrinsic parameter in the second camera 30 that defines a correspondence between coordinate points in the reference coordinate system and coordinate points in the camera three-dimensional coordinate system of the second camera 30 (second extrinsic parameter adjusted to reference coordinate system; hereinafter sometimes referred to as "converted second extrinsic parameter"), but the embodiment is not limited thereto. The second reference coordinate system camera information only needs to be information indicating a correspondence between the reference coordinate system and the coordinate system of the second camera 30. A specific method for calculating the second reference coordinate system camera information is described below.

When the second calculation unit 502 according to the present embodiment receives information on the second camera 30 from the data server 10, that is, when the second marker 80 is detected from a video taken by the moving camera 40, the second calculation unit 502 converts the second extrinsic parameter into second reference coordinate system camera information. As described above, when the second marker 80 is detected, third camera information and third marker information corresponding to the second marker 80 are transferred from the data storage unit 454 to the information conversion unit 408. The second calculation unit 502 specifies the three-dimensional position (x, y, z) and orientation (rotation) of the second marker 80 in the reference coordinate system (in the present example, its origin is first marker 70) based on third camera information and third marker information corresponding to the second marker 80 received from the data storage unit 454. More specifically, the second calculation unit 502 specifies the position and orientation of the second marker 80 in the reference coordinate system based on the position and orientation of the second marker 80 indicated by the third marker information and the third extrinsic parameter and the third intrinsic parameter included in the third camera information. For example, the third extrinsic parameter included in the third camera in indicates a difference between the movement amount and the rotation amount of the moving camera 40, that is, the orientation of the moving camera 40 upon the detection of the first marker 70 and the orientation of the moving camera 40 upon the detection of the second marker 80.

As described above, in the present example, third camera information and third marker information corresponding to the second marker 80 are determined based on a video taken by the moving camera 40. Thus, it can be considered that the second calculation unit 502 specifies the position and orientation of the second marker 80 in the reference coordinate system based on the video taken by the moving camera 40.

The second calculation unit 502 calculates a second extrinsic parameter in the second camera 30 adjusted to the reference coordinate system as second reference coordinate system camera information based on the position and orientation of the second marker 80 in the reference coordinate system the second intrinsic parameter in the second camera 30, and the position and orientation of the second marker 80 in the second image. In the present example, the second intrinsic parameter in the second camera 30 is included in the second camera information received from the data server 10. The information indicating the position of the second marker 80 in the second image is included in the second marker information received from the data server 10. As described above, second camera information on the second camera 30 and the second marker information are determined based on the second image.

From the above, it can be recognized that the second calculation unit 502 according to the present embodiment calculates second reference coordinate system camera information indicating the position of the second camera 30 in the reference coordinate system based on the second image and the video taken by the moving camera 40. The second reference coordinate system camera information is an example of "second camera positional information", but the embodiment is not limited thereto. As described above, in the present example, the second reference coordinate system camera information is a converted second extrinsic parameter in the second camera 30, but the embodiment is not limited thereto. The first reference coordinate system camera information and the second reference coordinate system camera information calculated by the calculation unit 421 as described above are stored in the storage unit 409. In the following description, the first reference coordinate system camera information and the second reference coordinate system camera information are sometimes referred to as "reference coordinate system camera information" unless otherwise distinguished.

Referring back to FIG. 8, the description is continued. The marker information conversion unit 422 is an example of "first conversion unit", and converts information on the position and shape of a first marker 70 included in a first image in accordance with a reference coordinate system to output first converted information, or converts information on the position and shape of a second marker 80 included in a second image in accordance with the reference coordinate system to output second converted information. Specific description is given below. In the present example, the marker information conversion unit 422 converts first marker information or second marker information in accordance with the above-described reference coordinate system. For example, the marker information conversion unit 422 can perform the above-described conversion by using the first reference coordinate system camera information or the second reference coordinate system camera information calculated by the calculation unit 421 and the first intrinsic parameter in the first camera 20 or the second intrinsic parameter in the second camera 30. In the following, the first marker information converted by the marker information conversion unit 422 is sometimes referred to as "converted first marker information", and the second marker information converted by the marker information conversion unit 422 is sometimes referred to as "converted second marker information". The first marker information and the second marker information are referred to as "converted marker information" unless otherwise distinguished. The converted marker information is stored in the storage unit 409. In the present example, the converted first marker information corresponds to the above-described "first converted information", and the converted second marker information corresponds to the above-described "second converted information", but the embodiment is not limited thereto.

Figure 10:
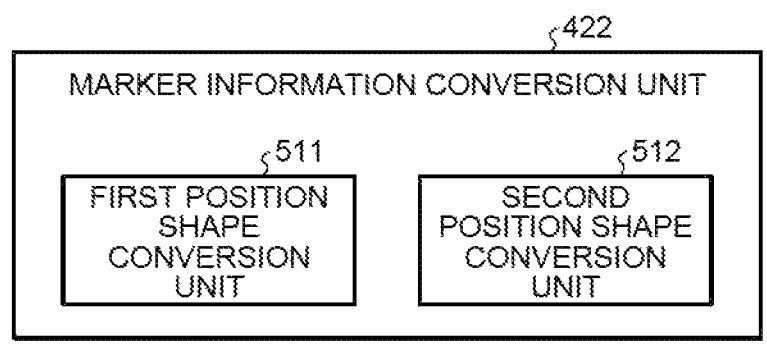
FIG. 10 is a diagram illustrating an example of functions of a marker information conversion unit according to the embodiment.

FIG. 10 is a diagram illustrating an example of functions of the marker information conversion unit 422. As illustrated in FIG. 10, the marker information conversion unit 422 includes a first position shape conversion unit 511 and a second position shape conversion unit 512. Note that the functions of the marker information conversion unit 422 are not limited thereto.

The first position shape conversion unit 511 converts information on the position and shape of the first marker 70 in the first image into information on the position and shape in the above-described reference coordinate system. For example, the first position shape conversion unit 511 uses the above-described first reference coordinate system camera information (in the present example, converted first extrinsic parameter) and the first intrinsic parameter in the first camera 20 acquired from the data server 10 to convert the first marker information acquired from the data server 10 in accordance with the reference coordinate system. In the following, the first marker information converted in accordance with the reference coordinate system is referred to as "converted first marker information".

Similarly, the second position shape conversion unit 512 converts information on the position and shape of a second marker 80 in a second image into information on the position and shape in the above-described reference coordinate system. For example, the second position shape conversion unit 512 uses the above-described second reference coordinate system camera information (in the present example, converted second extrinsic parameter) and the second intrinsic parameter in the second camera 30 acquired from the data server 10 to convert the second marker information acquired from the data server 10 in accordance with the reference coordinate system. In the following, the second marker information converted in accordance with the reference coordinate system is referred to as "converted second marker information".

Referring back to FIG. 8, the description is continued. The spatial feature information conversion unit 423 converts first or second spatial feature information in accordance with the above-described reference coordinate system. For example, the spatial feature information conversion unit 423 can perform the above-described conversion by using the first or second reference coordinate system camera information calculated by the calculation unit 421 and a known first intrinsic parameter in the first camera 20 or a known second intrinsic parameter in the second camera 30. In the following the first spatial feature information converted by the spatial feature information conversion unit 423 is sometimes referred to as "converted first spatial feature information", and the converted second spatial feature information is sometimes referred to as "converted second spatial feature information". The converted first spatial feature information and the converted second spatial feature intimation are referred to as "converted spatial feature information" unless otherwise distinguished. The converted spatial feature information is stored in the storage unit 409.

Figure 11:
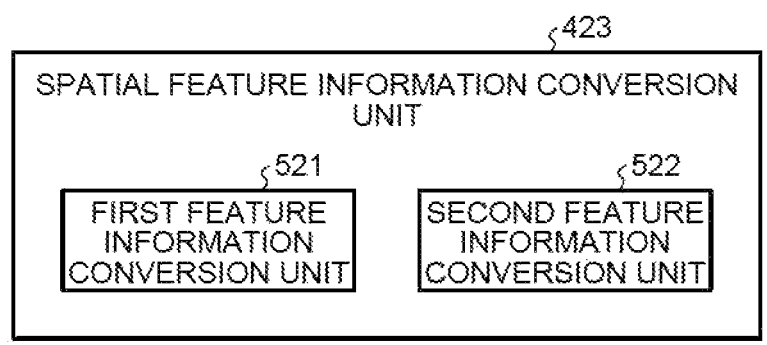
FIG. 11 is a diagram illustrating an example of functions of a spatial feature information conversion unit according to the embodiment.

FIG. 11 is a diagram illustrating an example of functions of the spatial feature information conversion unit 423. As illustrated in FIG. 11, the spatial feature information conversion unit 423 includes a first feature information conversion unit 521 and a second feature information conversion unit 522. Note that the functions of the spatial feature information conversion unit 423 are not limited thereto.

The first feature information conversion unit 521 converts the above-described first spatial feature information in accordance with the above-described reference coordinate system. The first feature information conversion unit 521 performs conversion such as scaling, translation, and rotational movement. For example, the first feature information conversion unit 521 uses the above-described first reference coordinate system camera information (in the present example, converted first extrinsic parameter) and the first intrinsic parameter in the first camera 20 acquired from the data server 10 to convert the first spatial feature information acquired from the data server 10 in accordance with the reference coordinate system.

Similarly, the second feature information conversion unit 522 converts the above-described second spatial feature information in accordance with the above-described reference coordinate system. For example, the second feature information conversion unit 522 uses the above-described second reference coordinate system camera information (in the present example, converted second extrinsic parameter) and the second intrinsic parameter in the second camera 30 acquired from the data server 10 to convert the second spatial feature information acquired from the data server 10 in accordance with the reference coordinate system.

Referring back to FIG. 8, the description is continued. As illustrated in FIG. 8, the storage unit 409 includes a camera information storage unit 431, a marker information storage unit 432, and a spatial feature information storage unit 433. The camera information storage unit 431 is a storage area in which the reference coordinate system camera information calculated by the calculation unit 421 is stored. The marker information storage unit 432 is a storage area in which the converted marker information convened by the marker information conversion unit 422 is stored. The spatial feature information storage unit 433 is a storage area in which the converted spatial feature information converted by the spatial feature information conversion unit 423 is stored.

As illustrated in FIG. 8, the simulation unit 410 includes a converted information acquisition unit 441, a marker information/spatial feature information conversion unit 112, a difference detection unit 443, a recalculation unit 444, and a correction unit 445.

The converted information acquisition unit 441 acquires convened information (including reference coordinate system camera information, converted marker information, and converted spatial feature information) from the storage unit 409. In the present example, the converted information acquisition unit 441 gives pieces of converted information on the first camera 20 and the second camera 30 to the difference detection unit 443 at timings at which the pieces of converted information on the first camera 20 and the second camera 30 are acquired.

The marker information/spatial feature information conversion unit 112 receives third identification information including identification information set to a reference coordinate system from the collation unit 407, converts information on the moving camera 40 side in accordance with the reference coordinate system, and gives the converted information to the difference detection unit 443. For example, the marker information/spatial feature information conversion unit 442 has a function for converting third marker information on the moving camera 40 in accordance with the above-described reference coordinate system. The marker information/spatial feature information conversion unit 442 is an example of "second conversion unit", and converts information on the position and shape of a first marker 70 included in a video taken by the moving camera 40 in accordance with the reference coordinate system to output third converted information. The marker information/spatial feature information conversion unit 442 converts information on the position and shape of a second marker 80 included in a video taken by the moving camera 40 in accordance with the reference coordinate system to output fourth converted information. More specific contents are described later. Furthermore, the marker information/spatial feature information conversion unit 412 has a function for converting third spatial feature information on the moving camera 40 in accordance with the above-described reference coordinate system.

Figure 12:
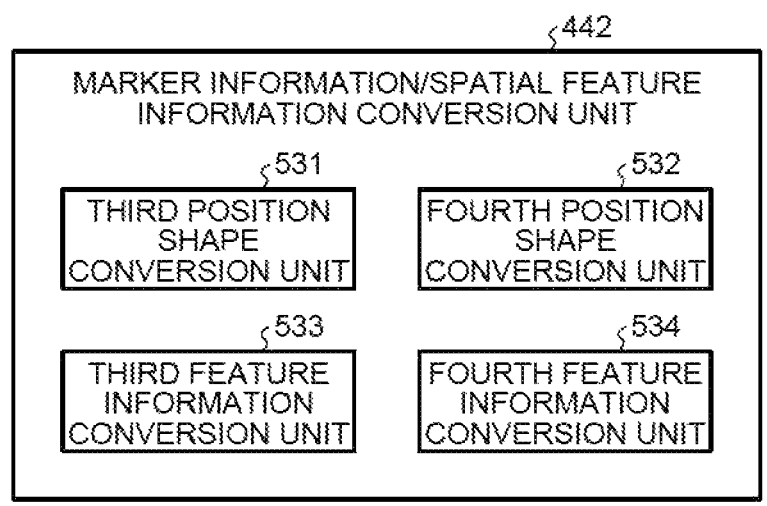
FIG. 12 is a diagram illustrating an example of functions of a marker information/spatial feature information conversion unit according to the embodiment.

FIG. 12 is a diagram illustrating an example of functions of the marker information/spatial feature information conversion unit 442. As illustrated in FIG. 12, for example, the marker information/spatial feature information conversion unit 442 includes a third position shape conversion unit 531, a fourth position shape conversion unit 532, a third feature information conversion unit 533, and a fourth feature information conversion unit 534. Note that the functions of the marker information/spatial feature information conversion unit 442 are not limited thereto. For example, the marker information/spatial feature information conversion unit 442 may have a function for constructing a space of the above-described reference coordinate system based on a video taken by the moving camera 40 (for example, constructing 3D model indicating three-dimensional point cloud).

The third position shape conversion unit 531 converts information on the position and shape of a first marker 70 in a video taken by the moving camera 40 into information on the position and shape in the above-described reference coordinate system. For example, the marker information/spatial feature information conversion unit 442 can perform the above-described conversion by using third intrinsic parameters and third extrinsic parameters in the moving camera 40 when the first marker 70 is detected by the moving camera 40. To the present example, the position of the first maker 70 in the reference coordinate system is set to the origin in the reference coordinate system, and hence information on the position and shape of the first marker 70 in the video taken by the moving camera 40 may be used. In the present example, information on the position and shape of the first marker 70 converted by the third position shape conversion unit 531 corresponds to the above-described "third converted information", but the embodiment is not limited thereto. Similarly, the fourth position shape conversion unit 532 converts information on the position and shape of a second marker 80 in a video taken by the moving camera 40 into information on the position and shape in the above-described reference coordinate system. For example, the marker information/spatial feature information conversion unit 442 can perform the above-described conversion by using third intrinsic parameters and third extrinsic parameters in the moving camera 40 when the second marker 80 is detected by the moving camera 40. In the present example, information on the position and shape of the second marker 80 converted by the fourth position shape conversion unit 532 corresponds to the above-described "fourth converted information", but the embodiment is not limited thereto.

The third feature information conversion unit 533 converts feature information on peripheral information on the first marker 70 in a video taken by the moving camera 40 into feature information in the above-described reference coordinate system. For example, the marker information/spatial feature information conversion unit 442 can perform the above-described conversion by using third intrinsic parameters and third extrinsic parameters in the moving camera 40 when the first marker 70 is detected by the moving camera 40. In the present example, the position of the first marker 70 in the reference coordinate system is set to the origin of the reference coordinate system, and hence feature information on peripheral information on the first marker 70 in a video taken by the moving camera 40 can be used. Similarly, the fourth feature information conversion unit 534 converts feature information on peripheral information on the second marker 80 in a video taken by the moving camera 40 into feature information in the above-described reference coordinate system. For example, the marker information/spatial feature information conversion unit 442 can perform the above-described conversion by using third intrinsic parameters and third extrinsic parameters in the moving camera 40 when the second marker 80 is detected by the moving camera 40.

Referring back to FIG. 8, the description is continued. The difference detection unit 443 detects a difference between converted marker information on the first camera 20 side and the second camera 30 side and converted marker information on the moving camera 40 side. In the present example, the difference detection unit 443 detects a first difference indicating a difference between information on the position and shape of the first marker 70 based on the first image and information on the position and shape of the first marker 70 based on the video taken by the moving camera 40. The difference detection unit 443 detects a second difference indicating a difference between information on the position and shape of the second marker 80 based on the second image and information on the position and shape of the second marker 80 based on the video taken by the moving camera 40. More specific description is given below.

The difference detection unit 443 detects a first difference indicating a difference between information on the position and shape of the first marker 70 converted by the above-described first position shape conversion unit 511 (in the present example, corresponding to "first converted information") and information on the position and shape of the first marker 70 convened by the above-described third position shape conversion unit 531 (in the present example, corresponding to "third converted information"). In other words, the difference detection unit 443 compares the above-described first converted information and the above-described third convened information with each other to detect the first difference. As described above, information on the position and shape of the first marker 70 converted by the first position shape conversion unit 511 is obtained by converting the position and shape of the first marker 70 in the first image into information on the position and shape in the reference coordinate system. Information on the position and shape of the first marker 70 converted by the third position shape conversion unit 531 is obtained by converting the position and shape of the first marker 70 in the video taken by the moving camera 40 into information on the position and shape in the reference coordinate system.

The difference detection unit 443 detects a second difference indicating a difference between information on the position and shape of the second marker 80 converted by the above-described second position shape conversion unit 512 (in the present example, corresponding to "second converted information") and information on the position and shape of the second marker 80 converted by the above-described fourth position shape conversion unit 532 (in the present example, corresponding to "fourth converted information"). In other words, the difference detection unit 443 compares the above-described second converted information and the above-described fourth converted information with each other to detect the second difference. As described above, information on the position and shape of the second marker 80 converted by the second position shape conversion unit 512 is obtained by convening the position and shape of the second marker 80 in the second image into information on the position and shape in the reference coordinate system. Information on the position and shape of the second marker 80 converted by the fourth position shape conversion unit 532 is obtained by converting information on the position and shape of the second marker 80 in the video taken by the moving camera 40 into the position and shape in the reference coordinate system. Note that, for example, the difference detection unit 443 may detect a first difference and a second difference by using a third extrinsic parameter in the moving camera 40 to perform viewpoint conversion of a marker as seen from a fixed camera, or perform viewpoint conversion in a reversed manner.

Furthermore, the difference detection unit 443 detects a third difference indicating a difference between the spatial feature information converted by the above-described first feature information conversion unit 521 and spatial feature information converted by the above-described third feature information conversion unit 533. In other words, the difference detection unit 443 performs detailed collation (may be collation based on partial match or approximation without being limited to exact match) including spatial feature information to detect the above-described third difference. As described above, spatial feature information converted by the first feature information conversion unit 521 is obtained by converting feature information on peripheral information on the first marker 70 in the first image into feature information in the above-described reference coordinate system. Spatial feature information converted by the third feature information conversion unit 533 is obtained by convening feature information on peripheral information on the first marker 70 in a video taken by the moving camera 40 into feature information in the above-described reference coordinate system.

Similarly, the difference detection unit 443 detects a fourth difference indicating a difference between the spatial feature information converted by the above-described second feature information conversion unit 522 and the spatial feature information converted by the above-described fourth feature information conversion unit 534. As described above, spatial feature information converted by the second feature information conversion unit 522 is obtained by converting feature information on peripheral information on the second marker 80 in the second image into feature information in the reference coordinate system. Spatial feature information converted by the fourth feature information conversion unit 534 is obtained by converting feature information on peripheral information on the second marker 80 in a video taken by the moving camera 40 into spatial feature information in the reference coordinate system.

The first to fourth differences detected by the difference detection unit 443 are input to the correction unit 445 as described above. The difference detection unit 443 civics, to the correction unit 445, values of the first difference and the third difference or values of the second difference and the fourth difference. The embodiment is not limited thereto, and the difference detection unit 113 may detect only the first difference or the second difference and give it to the correction unit 445. The correction unit 445 corrects the above-described first reference coordinate system camera information (in the present example, the converted first extrinsic parameter) based on the first difference, and corrects the above-described second reference coordinate system camera information (in the present example, the converted second extrinsic parameter) based on the second difference. Alternatively, the correction unit 445 may correct the above-described first reference coordinate system camera information (in the present example, the converted first extrinsic parameter) based on the first difference and the third difference, and correct the above-described second reference coordinate system camera information (in the present example, the converted second extrinsic parameter) based on the second difference and the fourth difference. More specifically, the correction unit 445 corrects the above-described first reference coordinate system camera information and the above-described second reference coordinate system camera information such that the first difference, the third difference, the second difference, and the fourth difference are equal to or smaller than an allowable value. The allowable value can be changed depending on design conditions.

When the first reference coordinate system camera information and the second reference coordinate system camera information are corrected by the correction unit 445, the corrected first reference coordinate system camera information and the corrected second reference coordinate system camera information are input to the recalculation unit 444. In the present example, when the recalculation unit 414 acquires the corrected first reference coordinate system camera information and the corrected second reference coordinate system camera information from the correction unit 445, the recalculation unit 444 acquires converted marker information and converted spatial feature information from the converted information acquisition unit 441. The recalculation unit 444 uses the corrected first reference coordinate system camera information and the corrected second reference coordinate system camera information acquired from the correction unit 445 to recalculate the converted marker information and the converted spatial feature information acquired from the converted information acquisition unit 441. The recalculation unit 444 inputs the recalculated marker information and the recalculated spatial feature information to the difference detection unit 443. The difference detection unit 443 detects the above-described first difference and the above-described third difference and the above-described second difference and the above-described fourth difference and inputs the differences to the correction unit 445 again.

When the first difference, the third difference, the second difference, and the fourth difference input from the difference detection unit 443 are each equal to or smaller than the allowable value, the correction unit 445 outputs first reference coordinate system camera information and second reference coordinate system camera information at that time, and outputs converted spatial feature information (spatial feature information converted in accordance with reference coordinate system) at that time.

For example, the output destination of the first reference coordinate system camera information, the second reference coordinate system camera information, and the converted spatial feature information from the correction unit 445 may be an information processing device or a server for providing final service such as an edge server (server in store) and a cloud server. For example, the server can generate service information based on processing using the information, and provide the service information to a user (for example, output to terminal (moving camera 40) carried by user). As the above-described processing, for example, various kinds of processing in recognition processing using images from the first camera 20 or the second camera 30 after position correction are assumed. Examples of such processing include processing of determining whether there is an area where a person or an object cannot move because of a high obstacle, processing of determining overlap of persons or objects, processing of superimposing data such as a movement path onto an image from the first camera 20 or the second camera 30, and processing of rendering a 3D space. The above-described processing is not limited to the examples described above.

The functions of the moving camera 40 described above are in by the CPU 103 executing computer programs stored in the storage device 104. However, the embodiment is not limited thereto. For example, the whole or part of the above-described functions of the moving camera 40 may be implemented by a dedicated hardware circuit. The marker information storage unit 253, the marker information storage unit 353, the marker information storage unit 453, the data storage unit 454, and the storage unit 409 may be, for example, the storage device 104. In the present embodiment, the moving camera 40 functions as "camera information calculation device" configured to calculate the above-described first reference coordinate system camera information and the above-described second reference coordinate system camera information.

Figure 13:
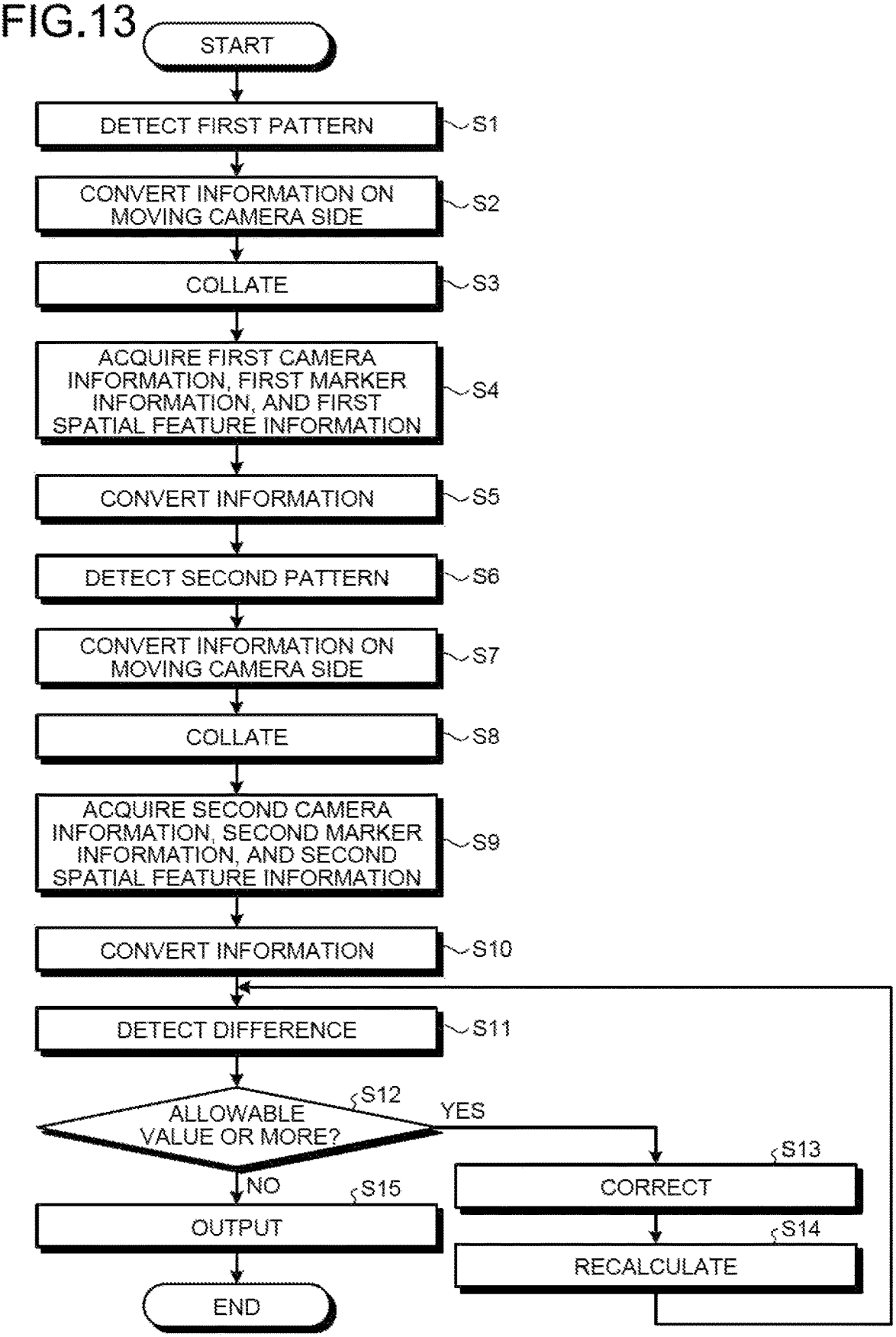
FIG. 13 is a flowchart illustrating an operation example of the moving camera according to the embodiment.

FIG. 13 is a flowchart illustrating an operation example of the moving camera 40 according to the present embodiment. Specific contents at steps are described above, and hence descriptions thereof are omitted as appropriate. Note that the order of the steps can be changed, and is not limited to the example in FIG. 13.

As illustrated in FIG. 13, when the marker detection unit 404 detects a first pattern (the first marker 70) (Step S1), the marker information/spatial feature information conversion unit 442 in the simulation unit 410 converts information on the moving camera 40 side (Step S2). As described above, the marker information/spatial feature information conversion unit 442 converts information on the position and shape of the first marker 70 detected by the marker detection unit 404 in accordance with a reference coordinate system. The marker information/spatial feature information conversion unit 442 converts feature information on peripheral information on the first marker 70 detected by the spatial feature detection unit 406 in accordance with the reference coordinate system. The specific contents are described above.

The collation unit 407 performs collation by determining whether first identification information corresponding to the first pattern (first marker 70) detected by the marker detection unit 404 is present in the data server 10 (Step S3). The description is continued on the assumption that the first identification information is present in the data server 10. Subsequently, the information conversion unit 408 acquires first camera information, first marker information, and first spatial feature information from the data server 10 (Step S4).

Next, the information conversion unit 408 converts the information (first camera information, first marker information, and first spatial feature information) acquired at Step S4 in accordance with the above-described reference coordinate system (Step S5). The specific contents are described above.

After that, when the moving camera 40 that has moved to a position at which the moving camera 40 can image an imaging range of the second camera 30 detects a second pattern (second marker 80) (Step S6), the marker information/spatial feature information conversion unit 442 converts information on the moving camera 40 side (Step S7). As described above, the marker information/spatial feature information conversion unit 442 converts information on the position and shape of the second marker 80 detected by the marker detection unit 404 in accordance with the reference coordinate system. The marker information/spatial feature information conversion unit 442 converts feature information on the peripheral information on the second marker 80 detected by the spatial feature detection unit 406 in accordance with the reference coordinate system. The specific contents are described above.

The collation unit 407 performs collation by determining whether second identification information corresponding to the second pattern (second marker 80) detected by the marker detection unit 404 is present in the data server 10 (Step S8). The description is continued on the assumption that the second identification information is present in the data server 10. Next, the information conversion unit 408 acquires second camera information, second marker information, and second spatial feature information from the data server 10 (Step S9).

Next, the information conversion unit 408 converts the information acquired at Step S9 (camera information on second camera 30, second marker information, and second spatial feature information) in accordance with the above-described reference coordinate system (Step S10). The specific contents are described above.

Next, the difference detection unit 443 in the simulation unit 410 detects the above-described first difference or the above-described second difference (Step S11). The specific contents are described above. When the first difference or the second difference detected at Step S11 is equal to or larger than an allowable value (Yes at Step S12), the correction unit 445 corrects the above-described first reference coordinate system camera information and the above-described second reference coordinate system camera information (Step S13). The recalculation unit 444 recalculates marker information and spatial feature information on the first camera 20 side or the second camera 30 side by using the corrected first reference coordinate system camera information and the corrected second reference coordinate system camera information (Step S14), and the processing after Step S11 is repeated.

On the other hand, when the first difference or the second difference detected at Step S11 is smaller than the allowable value (No at Step S12), first reference coordinate system camera information and second reference coordinate system camera information at that time are output, and converted spatial feature information at that time is output (Step S15).

As described above, the moving camera 40 calculates first reference coordinate system camera information indicating the position of the first camera 20 based on a first image including the first marker 70 that is taken by the first camera 20 and a first video including the first marker 70 that is taken by the moving camera 40. The moving camera 40 calculates second reference coordinate system camera information indicating the position of the second camera 30 based on a second image including the second marker 80 that is taken by the second camera 30 disposed away from the first camera 20 and a second video including the second marker 80 that is taken by the moving camera 40. More specifically, when the moving camera 40 detects the first marker 70 from a video taken while moving, the moving camera 40 calculates, based on the first image, first reference coordinate system camera information indicating the position of the first camera 20 in a reference coordinate system in which the first marker 70 is a reference. After that, when the moving camera 40 detects the second marker 80 from a video taken while moving, the moving camera 40 calculates, based on the second image and the taken video, second reference coordinate system camera information indicating the position of the second camera 30 in the reference coordinate system. In short, in the present embodiment, the imaging range of the first camera 20 and the imaging range of the second camera 30 are recognized from video taken by the moving camera 40, and the first camera 20 and the second camera 30 are mapped in the reference coordinate system of the moving camera 40.

According to the present embodiment, for example, even when it is difficult to image a common object in images taken by the first camera 20 and the second camera 30, the positional relation between the first camera 20 and the second camera 30 in the reference coordinate system can be determined. In other words, the positional relation of a plurality of cameras that cannot image a common object in taken images thereof can be determined.

Moreover, the moving camera 40 detects a first difference (difference of first marker 70) indicating a difference between information on the position and shape of the first marker 70 based on the first image and information on the position and shape of the first marker 70 based on the video from the moving camera 40. The moving camera 40 detects a second difference (difference of second marker 80) indicating a difference between information on the position and shape of the second marker 80 based on the second image and information on the position and shape of the second marker 80 based on the video from the moving camera 40. The moving camera 40 corrects first reference coordinate system camera information and second reference coordinate system camera information such that the first difference or the second difference is equal to or smaller than an allowable value. In this manner, the positional relation of the first camera 20 and the second camera 30 in the reference coordinate system can be more accurately determined. In the present embodiment, the positions of the first camera 20 and the second camera 30 in the reference coordinate system are determined based on the first difference or the second difference, but the embodiment not limited thereto. The positions of the first camera 20 and the second camera 30 in the reference coordinate system may be determined based on the first difference and the third difference (difference of peripheral information on first marker 70) or the second difference and the fourth difference (difference of peripheral information on second marker 80).

While the embodiment has been described above, the camera information calculation device, the system, the camera information calculation method, and the recording medium disclosed in the present application are not limited to the above-described embodiment as it is, and can be embodied by modifying the components within a range not departing from the gist thereof in implementation. Various embodiments can be formed by an appropriate combination of the components disclosed in the above-described embodiment. For example, some components may be removed from all components described in the embodiment.

Modifications will be described below. For example, the following modifications can be combined.

FIRST MODIFICATION

Figure 14:
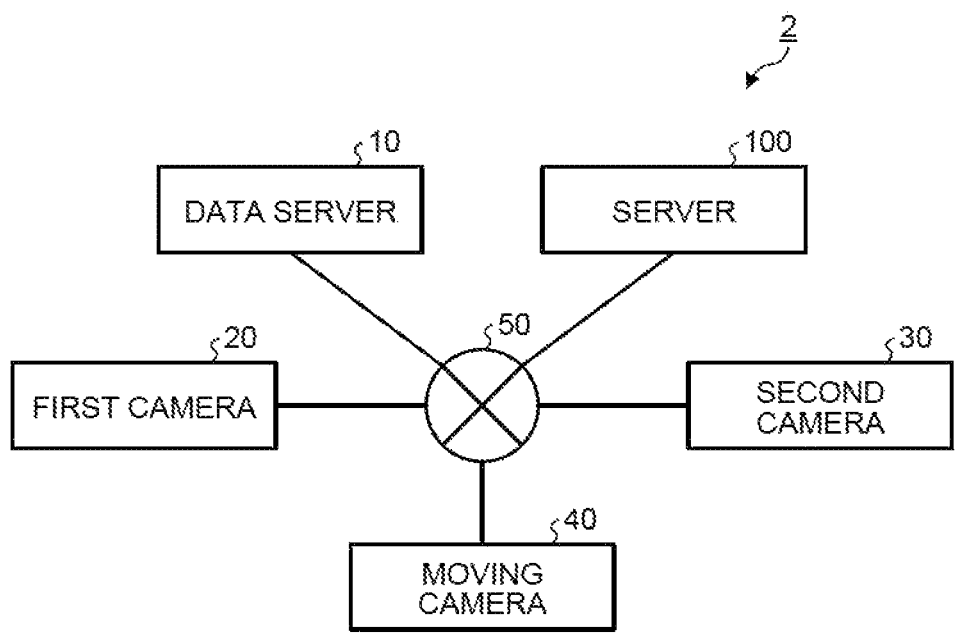
FIG. 14 is a diagram illustrating an example of a system configuration according to a modification.

In the above-described embodiment, the moving camera 40 functions as a "camera information calculation device" that calculates the above-described first reference coordinate system camera information and the above-described second reference coordinate system camera information. Alternatively, a device different from the moving camera 40 may function as the "camera information calculation device". For example, as illustrated in FIG. 14, a server 100 that functions as the "camera information calculation device" may be provided separately from the moving camera 40. As illustrated in FIG. 14, a system 2 according to the present modification includes a data server 10, the server 100, a first camera 20, a second camera 30, and a moving camera 40. The server 100 is communicably connected to the data server 10 the first camera 20, the second camera 30, and the moving camera 40 over a network 50.

Figure 15:
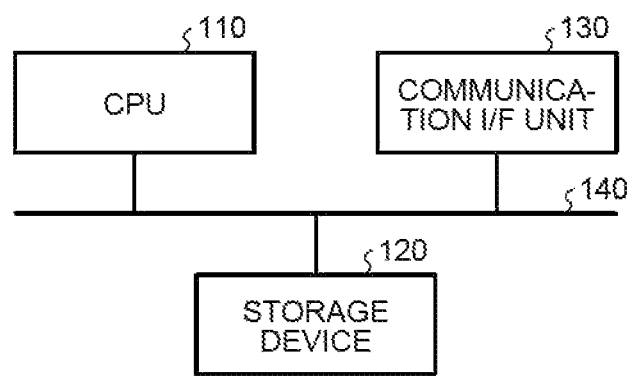
FIG. 15 is a diagram illustrating an example of a hardware configuration of a server according to the modification.

FIG. 15 is a diagram illustrating an example of a hardware configuration of the server 100. FIG. 15 exemplifies the minimum required hardware elements, but the embodiment is not limited thereto. The server 100 may include other hardware elements (such as input device, display device, and camera). As illustrated in FIG. 15, the server 100 includes a CPU 110, a storage device 120, as communication I/F unit 130, and a bus 140 for connecting these units to one another.

The CPU 110 corresponds to an example of a hardware processor. The CPU 110 controls the operation of the server 100. The CPU 110 implements various kinds of functions of the server 100 by executing computer programs stored in the storage device 120. Various kinds of data such as computer programs are stored in the storage device 120. For example, the storage device 120 includes a ROM as a non-volatile memory for storing computer programs therein and a RAM as a volatile memory having a work area of the CPU 110. The communication I/F unit 130 is an interface for connection to the network 50.

Figure 16:
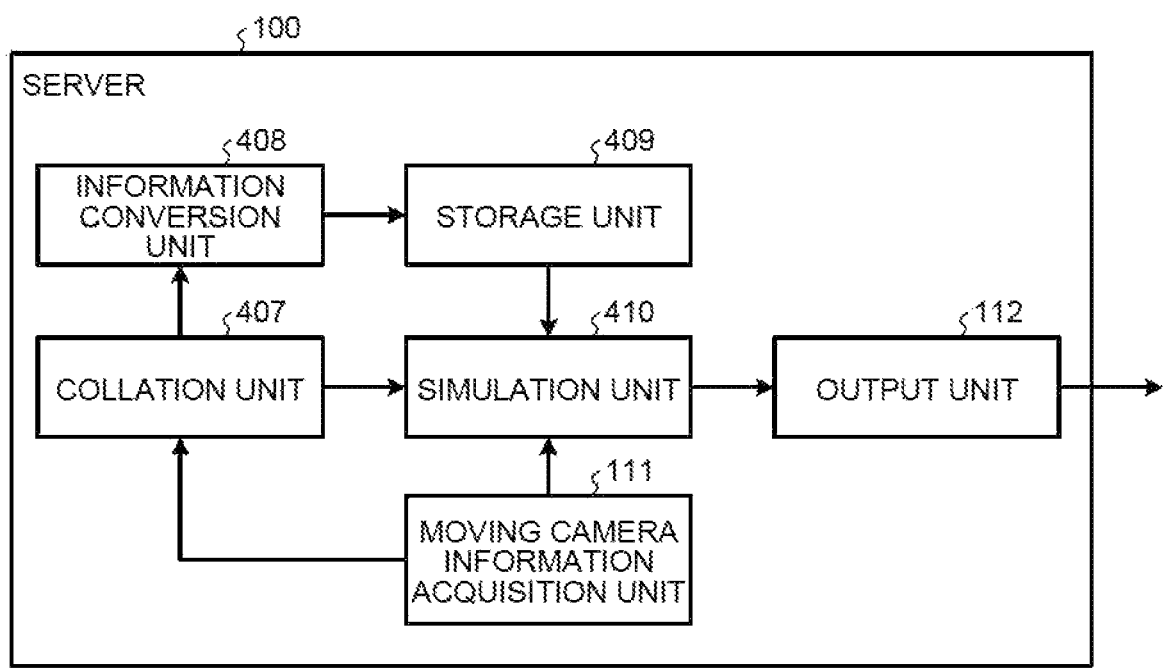
FIG. 16 is a diagram illustrating an example of functions of the server according to the modification.

FIG. 16 is a diagram illustrating an example of functions of the server 100. Note that the functions of the server 100 are not limited to the example in FIG. 16. As illustrated in FIG. 16, the server 100 includes a moving camera information acquisition unit 111, a collation unit 407, an information conversion unit 408, a storage unit 409, a simulation unit 410, and an output unit 112. In the present example, part of the functions (collation unit 407, information conversion unit 408, storage unit 409, and simulation unit 410) of the moving camera 40 described in the above-described embodiment are mounted in the server 100.

The moving camera information acquisition unit 111 illustrated in FIG. 16 acquires third camera information, third marker information, third identification information, and third spatial feature information on the moving camera 40 from the moving camera 40. The output unit 112 illustrated in FIG. 16 generates service information based on processing using first reference coordinate system camera information and second reference coordinate system camera information calculated by the server 100, and outputs the generated service information to the moving camera 40 (user terminal).

Note that, for example, the server 100 may be configured by a single computer or configured by a plurality of computers (computer group). For example, the server 100 may be configured by computers, and a plurality of functions of the above-described server 100 may be mounted on the computers in a distributed manner.

SECOND MODIFICATION

In the above-described embodiment, the first pattern (first marker 70) corresponding to the first identification information has been described as an example of "first object" included in the first image taken by the first camera 20. However, the embodiment is not limited thereto, and, for example, the first marker 70 is not necessarily required to be provided, and an object other than the first marker 70 may be the first object. In other words, an object other than the first marker 70 that is present in the imaging range of the first camera 20 and is in common between the first image from the first camera 20 and the video from the moving camera 40, for example, an object whose size and shape are well known or a boundary between the ground and a wall may be the first object.

Similarly, in the above-described embodiment, the second pattern (second marker 80) corresponding to the second identification information has been described as an example of "second object" included in the second image taken by the second camera 30. However, the embodiment is not limited thereto, and, for example, the second marker 80 is not necessarily required to be provided, and an object other than the second marker 80 may be the second object. In other words, an object other than the second marker 80 that is present in the imaging range of the second camera 30 and is in common between the second image from the second camera 30 and the video from the moving camera 40, for example, an object whose size and shape are well known or a boundary between the ground and a wall may be the second object.

THIRD MODIFICATION

In the above-described embodiment, two cameras with optional positions and orientations and two markers corresponding to the two cameras on a one-to-one basis are is provided, but the numbers of the cameras and the markers are not limited to two. For example, three or more cameras with optional positions and orientations and three or more markers corresponding to the three or more cameras on a one-to-one basis may be provided. The markers are not necessarily required to correspond to the cameras on a one-to-one basis as long as at least one marker can be imaged by a camera that can be installed in optional position and orientation, and the number of markers provided may be smaller than that of the cameras. The same method as in the case of the above-described embodiment can be implemented even in such a form. In this manner, for each of three or more cameras, camera information for specifying the position of the camera in a reference coordinate system for the moving camera 40 in which a marker detected first by the moving camera 40 is a reference can be calculated.

FOURTH MODIFICATION

The system 1 according to the above-described embodiment is applied inside a store (indoors), but the embodiment is not limited thereto. For example, the system 1 can be applied outdoors. For example, a fixed camera may be installed near a traffic light, and a vehicle having a camera mounted thereon may be used as a moving camera.

Each of the computer programs (or programmed instructions) according to the embodiment and the modifications described above may be provided by being recorded on a non-transitory computer-readable recording medium such as a compact disk read only memory (CD-ROM), a flexible disk (FD), a compact disk recordable (CD-R), or a digital versatile disk (DVD), in an installable or executable file format.

What is claimed is:

1. A camera information calculation device comprising a hardware processor configured to function as:
   a first calculation unit to calculate, based on a first image and a first video, first camera positional information indicating a position of a first camera, the first image including a first object taken by the first camera, the first video including the first object taken by a third camera; and
   a second calculation unit to calculate, based on a second image and a second video, second camera positional information indicating a position of a second camera disposed away from the first camera, the second image including a second object taken by the second camera, the second video including the second object taken by the third camera,
   wherein the third camera is a moving camera that images while moving between a position possible to take the first object and a position possible to take the second object.

2. The camera information calculation device according to claim 1, wherein
   the first camera positional information indicates a correspondence between a reference coordinate system being in common among the first to the third cameras and a coordinate system of the first camera, and
   the second camera positional information indicates a correspondence between the reference coordinate system and a coordinate system of the second camera.

3. The camera information calculation device according to claim 2, wherein the hardware processor is further configured to function as:
   a first conversion unit to
     convert information on a position and a shape of the first object included in the first image in accordance with the reference coordinate system to output first converted information, and
     convert information on a position and a shape of the second object included in the second image in accordance with the reference coordinate system to output second converted information;
   a second conversion unit to
     convert information on a position and a shape of the first object included in the first video in accordance with the reference coordinate system to output third converted information, and
     convert information on a position and a shape of the second object included in the second video in accordance with the reference coordinate system to output fourth converted information; and
   a difference detection unit to
     detect a first difference by comparing the first converted information and the third converted information, and
     detect a second difference by comparing the second converted information and the fourth converted information.

4. The camera information calculation device according to claim 3, wherein the hardware processor is further configured to function as a correction unit to correct the first camera positional information based on the first difference and correct the second camera positional information based on the second difference.

5. The camera information calculation device according to claim 1, wherein at least part of an imaging range of the first video and at least part of an imaging range of the second video overlap with each other.

6. A system comprising:
   a first camera configured to take a first image including a first object;
   a second camera configured to take a second image including a second object; and
   a third camera configured to take a first video including the first object and take a second video including the second object, the third camera including a hardware processor configured to function as
     a first calculation unit to calculate, based on the first image and the first video, first camera positional information indicating a position of the first camera, and
     a second calculation unit to calculate, based on the second image and the second video, second camera positional information indicating a position of the second camera,
   wherein the third camera is a moving camera that images while moving between a position possible to take the first object and a position possible to take the second object.

7. A system comprising:
   a first camera configured to take a first image including a first object;

a second camera configured to take a second image including a second object;

a third camera configured to take a first video including the first object and a second video including the second object; and a server including a hardware processor configured to function as a first calculation unit to calculate, based on the first image and the first video, first camera positional information indicating a position of the first camera; and a second calculation unit to calculate, based on the second image and the second video, second camera positional information indicating a position of the second camera, wherein the third camera is a moving camera that images while moving between a position possible to take the first object and a position possible to take the second object.

* * * * *